US012197346B2

(12) United States Patent
Tadokoro

(10) Patent No.: US 12,197,346 B2
(45) Date of Patent: Jan. 14, 2025

(54) MEMORY SYSTEM HAVING A CONTROLLER MANAGING A LOGICAL ADDRESS SPACE USING NAMESPACES AND CONTROL METHOD OF THE CONTROLLER

(71) Applicant: Kioxia Corporation, Tokyo (JP)

(72) Inventor: Mitsunori Tadokoro, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 39 days.

(21) Appl. No.: 18/176,455

(22) Filed: Feb. 28, 2023

(65) Prior Publication Data

US 2024/0095182 A1 Mar. 21, 2024

(30) Foreign Application Priority Data

Sep. 16, 2022 (JP) ................. 2022-147974

(51) Int. Cl.
*G06F 3/06* (2006.01)
*G06F 12/02* (2006.01)
*G06F 12/1009* (2016.01)

(52) U.S. Cl.
CPC .......... *G06F 12/1009* (2013.01); *G06F 3/061* (2013.01); *G06F 3/0644* (2013.01); *G06F 3/0679* (2013.01); *G06F 12/0246* (2013.01); *G06F 2212/7201* (2013.01)

(58) Field of Classification Search
CPC ...... G06F 3/061; G06F 3/0644; G06F 3/0656; G06F 3/0679; G06F 12/0246; G06F 12/1009; G06F 2212/7201
See application file for complete search history.

(56) References Cited

U.S. PATENT DOCUMENTS

| 11,347,412 B2 | 5/2022 | Tadokoro |
| 2002/0112126 A1 | 8/2002 | Hayakawa |
| 2018/0260334 A1* | 9/2018 | Asano ................. G06F 12/0246 |
| 2020/0133849 A1* | 4/2020 | Harris ................. G06F 12/0246 |
| 2021/0294506 A1* | 9/2021 | Tadokoro ............. G06F 3/0673 |
| 2021/0406177 A1 | 12/2021 | Patel |

FOREIGN PATENT DOCUMENTS

| JP | 2002-236616 A | 8/2002 |
| JP | 2009-252004 A | 10/2009 |

* cited by examiner

*Primary Examiner* — Larry T MacKall
(74) *Attorney, Agent, or Firm* — Kim & Stewart LLP

(57) ABSTRACT

A controller assigns, for each namespace, one logical area of a logical address space as a first logical area including a last logical address of the namespace and assigns one or more of logical areas as second logical areas. The controller divides a memory region in which an address translation table is stored into buffer regions. For each second logical area, the controller assigns one buffer region for storing map segments corresponding to the second logical area, and manages a first pointer indicating a storage location of the buffer region assigned thereto. The controller also assigns one buffer region for map segments corresponding to the first logical areas of two or more namespaces, and manages second pointers respectively indicating storage locations in the one buffer region, in which the map segments corresponding to the first logical areas of the two or more namespaces are respectively stored.

20 Claims, 17 Drawing Sheets

United States Patent

MEMORY SYSTEM HAVING A CONTROLLER MANAGING A LOGICAL ADDRESS SPACE USING NAMESPACES AND CONTROL METHOD OF THE CONTROLLER

CROSS-REFERENCE TO RELATED APPLICATION

This application is based upon and claims the benefit of priority from Japanese Patent Application No. 2022-147974, filed Sep. 16, 2022, the entire contents of which are incorporated herein by reference.

FIELD

Embodiments described herein relate generally to techniques for controlling a non-volatile memory.

BACKGROUND

In recent years, memory systems with non-volatile memories have become widespread. As one of such memory systems, a solid state drive (SSD) with a NAND flash memory is known.

A memory system such as an SSD requires a technique capable of efficiently managing mapping information that is information indicating the correspondence between logical addresses and physical addresses.

DETAILED DESCRIPTION

Embodiments provide a memory system and a control method capable of efficiently managing mapping information.

In general, according to one embodiment, a memory system is connectable to a host. The memory system includes a non-volatile memory, a random access memory, and a controller electrically coupled to the non-volatile memory and the random access memory. The controller stores, in the random access memory, a logical-to-physical address translation table including mapping information having a plurality of map segments each indicating N physical addresses of the non-volatile memory respectively associated with consecutive N logical addresses of a logical address space managed by the controller. The N is an integer of 2 or more. The controller manages a plurality of namespaces each including a set of logical addresses, and divides the logical address space into a plurality of logical areas having the same size. The controller divides a storage region of the random access memory, in which the logical-to-physical address translation table is stored, into a plurality of buffer regions. For each namespace, based on a size of the namespace, the controller assigns one of the logical areas as a first logical area including at least a last logical address of the namespace, and assigns one or more logical areas as second logical areas. For each second area, the controller assigns one buffer region among the plurality of buffer regions, as a buffer region in which a plurality of the map segments corresponding to the second logical area are stored, and manages a first pointer indicating a head storage location of the buffer region assigned to the second logical area. The controller assigns one buffer region in which a plurality of map segments corresponding to the first logical areas of two or more namespaces are stored. The controller manages a plurality of second pointers respectively indicating a plurality of storage locations in the one buffer region, in which the plurality of map segments corresponding to the first logical areas of the two or more namespaces are respectively stored.

Embodiments will be described below with reference to the drawings.

Figure 1:
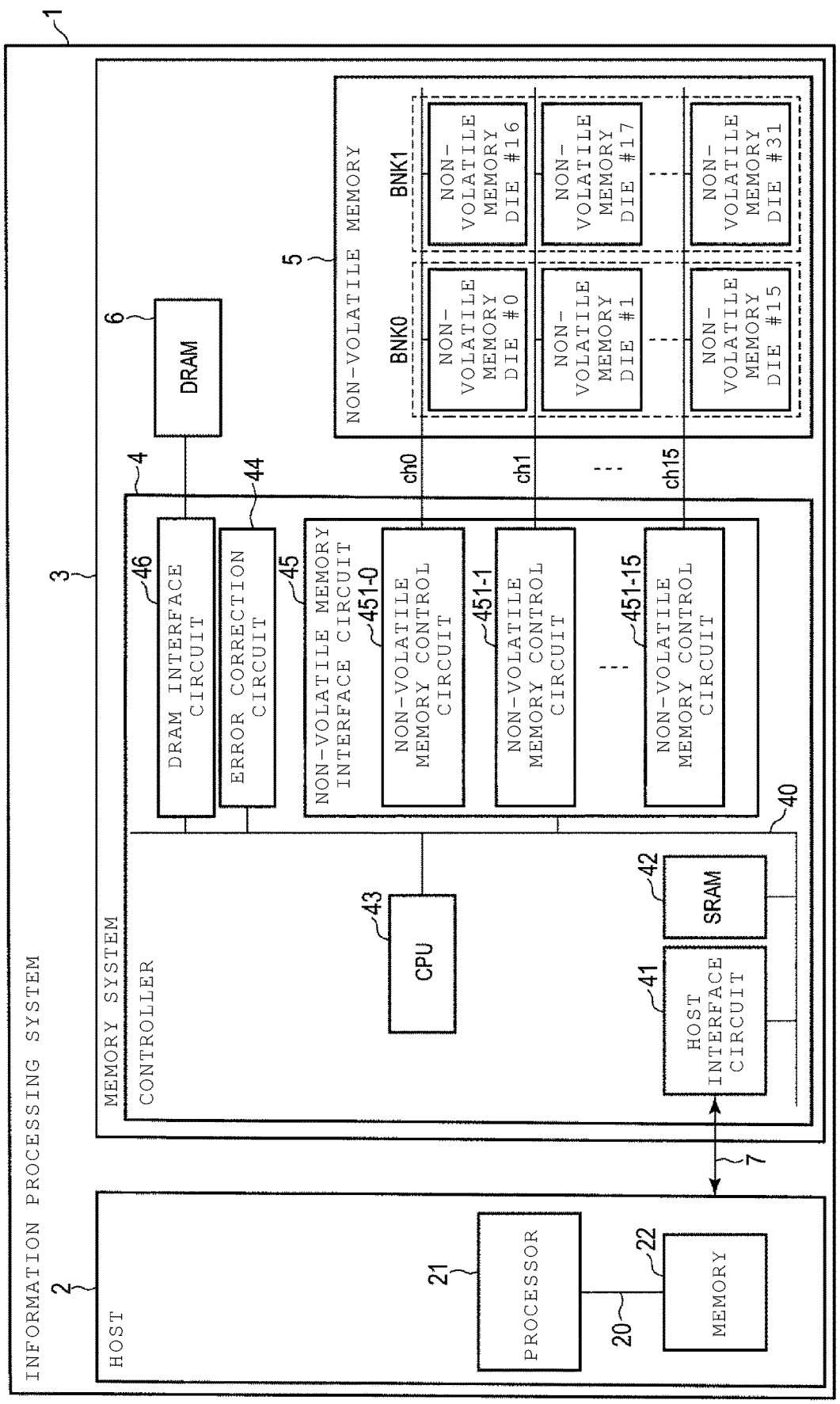
FIG. 1 is a block diagram showing a configuration example of an information processing system including a memory system according to an embodiment.

FIG. 1 is a block diagram showing a configuration example of an information processing system 1 including a memory system 3 according to an embodiment. The information processing system 1 includes a host (host device) 2 and the memory system 3.

The host 2 is an information processing apparatus. The host 2 is, for example, a personal computer, a server computer, or a mobile terminal. The host 2 accesses the memory system 3. Specifically, the host 2 transmits a write command, which is a command for writing data, to the memory system 3. Further, the host 2 transmits a read command, which is a command for reading data, to the memory system 3.

The memory system 3 is a storage device. The memory system 3 is, for example, an SSD including a NAND flash memory. The memory system 3 writes data into the non-volatile memory. Further, the memory system 3 reads data from the non-volatile memory.

The host 2 and the memory system 3 may be connected via a bus 7. Communication between the host 2 and the memory system 3 via the bus 7 is performed in compliance with, for example, the NVM Express® (NVMe®) standard or the Serial Attached SCSI (SAS) standard. The bus 7 is, for example, a bus conforming to the PCI Express® standard (PCIe® bus). The bus 7 is primarily used for transmitting an input/output (I/O) command from the host 2 to the memory system 3 and for transmitting responses from the memory system 3 to the host 2. The I/O command is a command for writing data to or reading data from a non-volatile memory. The I/O command is, for example, a write command and a read command.

Next, the internal configuration of the host 2 will be described. The host 2 includes a processor 21 and a memory 22. The processor 21 and the memory 22 are connected to an internal bus 20.

The processor 21 is a central processing unit (CPU). The processor 21 communicates with the memory system 3 via the bus 7. The processor 21 executes software (host software) loaded in the memory 22. The host software is loaded into the memory 22 from, for example, the memory system 3 or other storage devices connected to the host 2. The host software includes, for example, operating systems, file systems, and application programs.

The memory 22 is a volatile memory. The memory 22 may also be referred to as a main memory, a system memory, or a host memory. The memory 22 is, for example, a dynamic random access memory (DRAM). A part of a storage area of the memory 22 is used as a data buffer. The data buffer stores write data to be written into the memory system 3 or read data transferred from the memory system 3.

Next, the internal configuration of the memory system 3 will be described. The memory system 3 includes a controller 4, a non-volatile memory 5, and a dynamic random access memory (DRAM) 6.

The controller 4 is a memory controller. The controller 4 is, for example, a semiconductor circuit such as a system-on-a-chip (SoC). The controller 4 is electrically coupled to the non-volatile memory 5. The controller 4 executes a process of writing data to the non-volatile memory 5, based on a write command received from the host 2. Further, the controller 4 executes a process of reading data from the non-volatile memory 5, based on a read command received from the host 2. As a physical interface connecting the controller 4 and the non-volatile memory 5, for example, a Toggle NAND flash interface or an open NAND flash interface (ONFI) is used. Further, the controller 4 is electrically coupled to the DRAM 6. The controller 4 writes data into the DRAM 6 and reads data from the DRAM 6. The function of each part of the controller 4 may be implemented by dedicated hardware, a processor executing a program, or a combination thereof.

The non-volatile memory 5 is a memory that stores data in a non-volatile manner. The non-volatile memory 5 is, for example, a NAND flash memory. The non-volatile memory 5 is, for example, a two-dimensional flash memory or a three-dimensional flash memory. The non-volatile memory 5 includes a plurality of non-volatile memory dies. The non-volatile memory die is also referred to as a non-volatile memory chip. Each of the plurality of non-volatile memory dies is implemented, for example, as a NAND flash memory die. In FIG. 1, the non-volatile memory 5 is shown to include 32 non-volatile memory dies #0 to #31.

The DRAM 6 is a volatile memory. The DRAM 6 includes, for example, a storage area used as a read/write buffer and a storage area for storing a logical-to-physical address translation table (L2P table). A storage area used as a read/write buffer of the DRAM 6 temporarily stores write data received from the host 2 or read data read from the non-volatile memory 5.

Next, the internal configuration of the controller 4 will be described. The controller 4 includes a host interface circuit 41, a static random access memory (SRAM) 42, a CPU 43, an error correction circuit 44, a non-volatile memory interface circuit 45, and a DRAM interface circuit 46. The host interface circuit 41, the SRAM 42, the CPU 43, the error correction circuit 44, the non-volatile memory interface circuit 45, and the DRAM interface circuit 46 are connected to an internal bus 40.

The host interface circuit 41 executes communication with the host 2. The host interface circuit 41 receives various commands from the host 2. Various commands are, for example, I/O commands.

The SRAM 42 is a volatile memory. A storage area of the SRAM 42 is used as a work area of the CPU 43, for example. Further, a part of the storage area of the SRAM 42 may be used as a read/write buffer.

The CPU 43 is a processor. The CPU 43 controls the host interface circuit 41, the SRAM 42, the error correction circuit 44, the non-volatile memory interface circuit 45, and the DRAM interface circuit 46. The CPU 43 loads a control program (firmware) stored in the non-volatile memory 5 or a ROM (not shown) into the SRAM 42. The CPU 43 performs various processes, based on the firmware. It should be noted that the firmware may be loaded into the DRAM 6, instead of being loaded into the SRAM 42.

The CPU 43 performs the management of data stored in the non-volatile memory 5 and the management of blocks included in the non-volatile memory 5 as, for example, a flash translation layer (FTL).

The management of data stored in the non-volatile memory 5 includes, for example, management of mapping information. The mapping information is information indicating the correspondence between each logical address in the logical address space managed by the memory system 3 (more specifically, by the controller 4) and each physical address of the non-volatile memory 5. The logical address may be either a logical block address (LBA) or a logical cluster address (LCA). In the following, it is assumed that LCAs are used as the logical addresses used by the memory system 3 to manage the logical address space of the memory system 3. The LCA is a logical address corresponding to 4 KB of data called a cluster. Meanwhile, LBAs are likely to be used as logical addresses used by the host 2 to access the memory system 3. The LBA is a logical address corresponding to data called a logical block (or sector). The size of a logical block that can be designated by one LBA is, for example, 512 bytes or 4 KB. When the size of the logical block that can be designated by one LBA is 4 KB, the CPU 43 uses the LBA used by the host 2 as the LCA. Meanwhile, when the size of the logical block that can be designated by one LBA is 512 bytes, the CPU 43 translates the LBA designated by the host 2 into LCA. A physical address is an address indicating a physical storage location in the non-volatile memory 5.

The management of blocks included in the non-volatile memory 5 includes management of defective blocks in the non-volatile memory 5, wear leveling, and garbage collection (compaction).

The error correction circuit 44 executes an encoding process and a decoding process. The error correction circuit 44 executes an encoding process, when data is written into the non-volatile memory 5. In the encoding process, the error correction circuit 44 adds a redundant code to the data to be written into the non-volatile memory 5. The redundant code is, for example, an error correction code (ECC). Further, when data is read from the non-volatile memory 5, the error correction circuit 44 executes the decoding process. In the decoding process, the error correction circuit 44 corrects errors in data read from the non-volatile memory 5. The error correction circuit 44 uses the ECC added to the data, when executing the error correction.

The non-volatile memory interface circuit 45 is a circuit that controls the non-volatile memory 5. The non-volatile memory interface circuit 45 includes, for example, non-volatile memory control circuits 451-0, 451-1, . . . , and 451-15. The non-volatile memory control circuits 451-0, 451-1, . . . , and 451-15 are connected to channels ch0, ch1, . . . , and ch15, respectively. The non-volatile memory control circuits 451-0, 451-1, . . . , and 451-15 are electrically coupled to one or more non-volatile memory dies via the channels ch0, ch1, . . . , and ch15, respectively. In FIG. 1, two non-volatile memory dies are connected to each of the channels ch0, ch1, . . . , and ch15. In this case, the non-volatile memory control circuit 451-0 is connected to the non-volatile memory die #0 and the non-volatile memory die #16 via the channel ch0. The non-volatile memory control circuit 451-1 is connected to the non-volatile memory die #1 and the non-volatile memory die #17 via the channel ch1. Further, the non-volatile memory control circuit 451-15 is connected to the non-volatile memory die #15 and the non-volatile memory die #31 via the channel ch15.

Individual non-volatile memory dies are independently operable. Therefore, the non-volatile memory die functions as a unit capable of parallel operation. The non-volatile memory dies #0, #1, . . . , and #15 are treated by the non-volatile memory interface circuit 45 as a bank BNK0. Similarly, the non-volatile memory dies #16, #17, . . . , and #31 are treated by the non-volatile memory interface circuit 45 as a bank BNK1. The bank is a unit to operate a plurality of non-volatile memory dies in parallel by an interleave operation.

In the configuration of the non-volatile memory 5 shown in FIG. 1, the non-volatile memory interface circuit 45 can access the non-volatile memory dies #0 to #31 in parallel, via 16 channels, by using the interleave operation. Therefore, the non-volatile memory interface circuit 45 can write data in parallel to up to 32 non-volatile memory dies. That is, the number of parallel write operations is 32. It should be noted that each of the non-volatile memory dies #0 to #31 may have a multi-plane configuration having a plurality of planes. For example, when each of the non-volatile memory dies #0 to #31 includes two planes, the non-volatile memory interface circuit 45 can write data to up to 64 planes in parallel. That is, the number of parallel write operations in this case is 64.

The DRAM interface circuit 46 is a circuit that controls the DRAM 6. The DRAM interface circuit 46 stores data in the DRAM 6. Further, the DRAM interface circuit 46 reads data stored in the DRAM 6.

Figure 2:
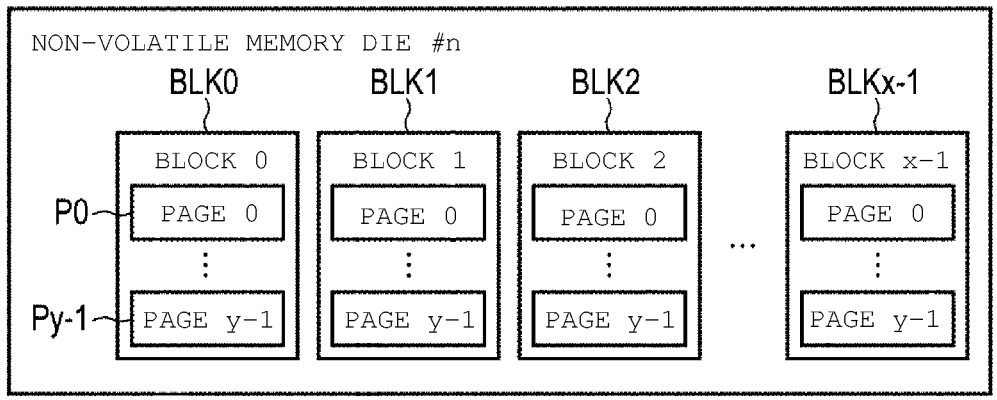
FIG. 2 is a block diagram showing an example of the internal configuration of a non-volatile memory die in the memory system according to the embodiment.

Next, the configuration of the non-volatile memory die will be described. FIG. 2 is a block diagram showing a configuration example of one of the plurality of non-volatile memory dies included in the non-volatile memory 5.

The non-volatile memory die #n is any non-volatile memory die among the non-volatile memory dies #0 to #31. The non-volatile memory die #n includes a plurality of blocks (here, blocks BLK0 to BLKx−1). Each of the blocks BLK0 to BLKx−1 includes a plurality of pages (here, pages P0 to Py−1). Each page includes a plurality of memory cells. Each of the blocks BLK0 to BLKx−1 is a unit of a data erase operation for erasing data. Each of the pages P0 to Py−1 is a unit of a data write operation and a data read operation. The data write operation is an operation of writing data to the non-volatile memory die #n in units of pages. The data read operation is an operation of reading data from the non-volatile memory die #n in units of pages.

Figure 3:
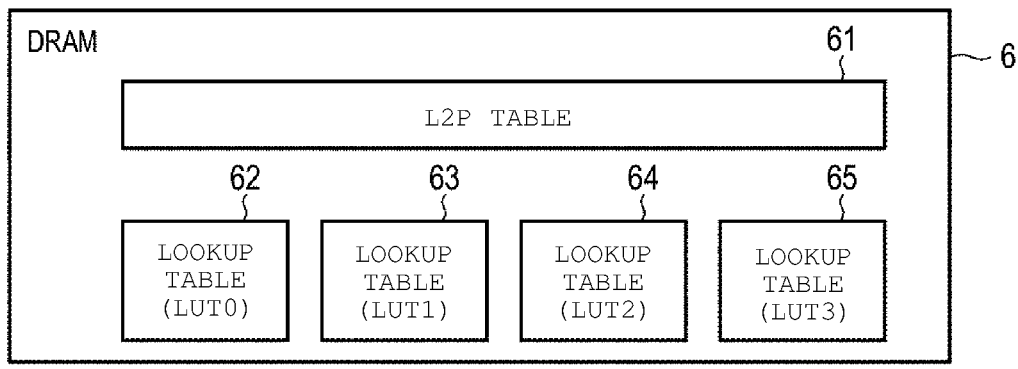
FIG. 3 is a block diagram showing an example of tables stored in a DRAM in the memory system according to the embodiment.

Next, tables stored in the DRAM 6 will be described. FIG. 3 is a block diagram showing an example of tables stored in the DRAM 6.

A storage area of the DRAM 6 is used to store an L2P table 61, a lookup table (LUT0) 62, a lookup table (LUT1) 63, a lookup table (LUT2) 64, and a lookup table (LUT3) 65. In the following, the lookup table (LUT0) 62, the lookup table (LUT1) 63, the lookup table (LUT2) 64, and the lookup table (LUT3) 65 are referred to as LUT0_62, LUT1_63, LUT2_64, and LUT3_65, respectively.

The L2P table 61 is a table that stores mapping information.

LUT0_62, LUT1_63, LUT2_64, and LUT3_65 are a hierarchical table group used to manage the mapping information of the L2P table 61 stored in the DRAM 6.

All or a part of LUT0_62, LUT1_63, LUT2_64, and LUT3_65 may be stored in a storage area of the SRAM 42 instead of being stored in the DRAM 6.

Figure 4:
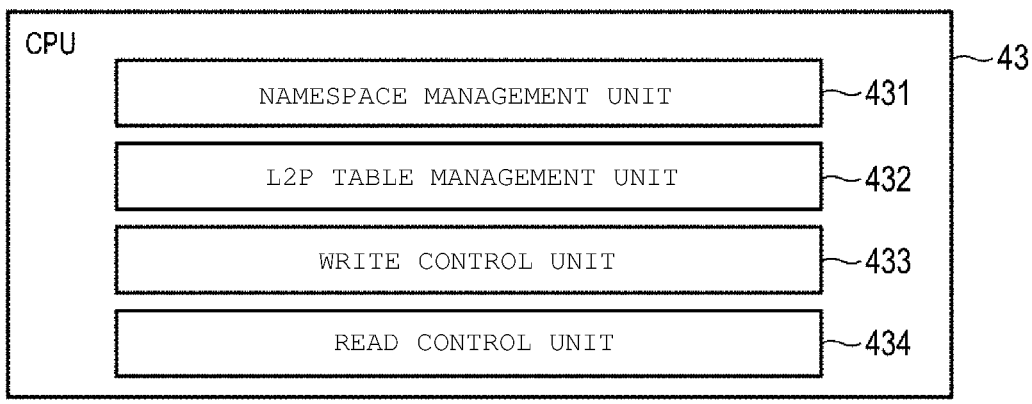
FIG. 4 is a block diagram showing an example of the functional configuration of a CPU in the memory system according to the embodiment.

Next, the functional configuration of the CPU 43 will be described. FIG. 4 is a block diagram showing an example of the functional configuration of the CPU 43.

The CPU 43 includes a namespace management unit 431, an L2P table management unit 432, a write control unit 433, and a read control unit 434, each of which is implemented as CPU 43 executing firmware. However, a part or all of these units may be implemented by dedicated hardware of the controller 4.

The namespace management unit 431 manages a plurality of namespaces. Each of the plurality of namespaces is a set of logical addresses. Each of the plurality of namespaces is used by the host 2 to access the memory system 3. Management of a namespace includes the assignment of namespace allocation units (NSAUs) to namespaces and the de-assignment of NSAUs to namespaces. One NSAU is one area of a plurality of areas obtained by equally dividing the logical address space of the memory system 3. The logical address space of the memory system 3 has a size corresponding to power-of-two ($=2^{(i+j)}$) clusters. The logical address space having a size corresponding to $2^{(i+j)}$ clusters is divided into power-of-two ($2^i$) areas (NSAUs). Therefore, one NSAU has a size corresponding to power-of-two ($2^j$) clusters. The namespace management unit 431 assigns one or more NSAUs to a namespace, based on the size of the namespace. For example, when a certain namespace is created, the namespace management unit 431 assigns one or a plurality of NSAUs that are not assigned to any namespace to this created namespace, based on the size of this created namespace. The size of a namespace is represented by the number of logical addresses (LBAs) provided in this namespace. The size of the namespace to be created is designated by the host 2. On the other hand, the size of each NSAU is determined by the memory system 3. Therefore, the size of the namespace is unlikely to be an integer multiple of the size of NSAU.

For example, when the size of the namespace instructed to be created is 1.5 times the size of NSAU, the namespace management unit 431 assigns two NSAUs, which have not been assigned to any namespace, to this namespace.

Further, for example, when the size of a certain namespace is expanded, the namespace management unit 431 assigns additional NSAUs that have not been assigned to any namespace, to the end of the namespace whose size is expanded, based on the size of the expanded namespace. Further, when reducing the size of a certain namespace, the namespace management unit 431 de-assigns the last one NSAU of the plurality of NSAUs assigned to the namespace, based on the size of the reduced namespace.

Thus, by adopting a configuration in which any NSAU in the logical address space can be assigned to each namespace, each namespace can be easily resized, compared to a configuration in which a range of consecutive logical addresses in the logical address space is assigned to each namespace. This is because, in the case of using the configuration in which a range of consecutive logical addresses in the logical address space is assigned to each namespace, in order to expand the size of a certain namespace, a range of free logical addresses needs to be allocated subsequently to the range of logical addresses currently assigned to this namespace. In this case, if the range of logical addresses subsequent to the range of logical addresses currently assigned to this namespace has already been assigned to a different namespace, the different namespace needs to be moved to a different range of logical addresses. In the process of moving the different namespace to a different range of logical addresses, a process of updating the L2P table 61 is required such that each physical address at which data of the different namespace is stored is associated with the different range of logical addresses. Therefore, it takes a relatively long time to move the different namespace to a different range of logical addresses.

The L2P table management unit 432 divides the storage area of the DRAM 6 in which the L2P table 61 is stored, into a plurality of buffer areas, also referred to herein as buffer regions. Here, the storage area of the DRAM 6 in which the L2P table 61 is stored is a storage area in the DRAM 6 allocated for the L2P table 61. The storage area in the DRAM 6 allocated for the L2P table 61 is also simply called a buffer. The size of each of the plurality of buffer areas can be set in accordance with the size of NSAU, that is, a size corresponding to $2^j$ clusters. Since the size of the buffer allocated for the L2P table 61 is determined based on the user capacity of the memory system 3, the size of the buffer is not always an integer multiple of the size corresponding to one NSAU. Therefore, only one buffer area out of these plurality of buffer areas may be set to a size less than the size corresponding to one NSAU, that is, a size corresponding to the number of clusters less than $2^j$ clusters. In the following description, the size corresponding to $2^j$ clusters is also referred to as a unit buffer size. Further, the L2P table management unit 432 classifies one or a plurality of NSAUs assigned to each namespace into a first NSAU including at least the last logical address (e.g., the largest logical address) of each namespace and a second NSAU excluding the first NSAU. When the size of the namespace is not an integer multiple of the size of NSAU, the first NSAU is an NSAU including a set of logical addresses used by this namespace and a set of logical addresses not used by this namespace. For example, for a namespace with a size 1.5 times the size of an NSAU, one first NSAU and one second NSAU are assigned thereto. Among the logical addresses of the one first NSAU, only half of the logical addresses are used by this namespace, and the other half of the logical addresses are not used by this namespace.

The L2P table management unit 432 assigns one buffer area of the plurality of buffer areas to one second NSAU of each of the plurality of namespaces. A plurality of map segments corresponding to each second NSAU are stored in the assigned buffer area. The map segments are a part of the overall mapping information in the L2P table 61. One map segment is information indicating N physical addresses of the nonvolatile memory 5, which are respectively associated with consecutive N logical addresses in a one-to-one relationship. Here, N is an integer of 2 or more. Details of the map segment will be described later with reference to FIG. 5.

Then, the L2P table management unit 432 manages a first pointer indicating the head storage location of the assigned buffer area, for each second NSAU. As the first pointer, for example, a memory address indicating the head storage location of this buffer area is used.

Further, the L2P table management unit 432 assigns any buffer area, which is not assigned to any second NSAU, to the first NSAU of each namespace such that one buffer area is shared by the first NSAUs of two or more namespaces. It should be noted that when there is sufficient free storage area in the buffer allocated for the L2P table 61, that is, when a plurality of buffer areas each having the same size as the unit buffer size can be allocated, there is no need to share one buffer area between the first NSAUs of each namespace. In this case, similar to the second NSAU of each namespace, one buffer area may be assigned to the first NSAU of each namespace.

When one buffer area is shared by the respective first NSAUs of two or more namespaces, the L2P table management unit 432 manages a plurality of second pointers, for respective first NSAUs of a plurality of namespaces. Each of the plurality of second pointers corresponds to one map segment among the plurality of map segments corresponding to the first NSAU. Each of the plurality of second pointers points to one storage location in the buffer area in which one corresponding map segment is stored. As the second pointer, for example, a memory address that can designate both the head storage location of a buffer area among the plurality of buffer areas and an offset indicating a storage location in map segment units in this buffer area, is used.

Thus, for one or more second NSAUs among one or a plurality of NSAUs assigned to each namespace, one buffer area is assigned to each NSAU. All logical addresses included in a second NSAU are used by the corresponding namespace. Therefore, all of the buffer area assigned to the second NSAU can be effectively used for storing a plurality of map segments corresponding to the second NSAU. Further, for a second NSAU, only one pointer indicating the head storage location of the buffer area assigned to this second NSAU is managed. Therefore, the capacity of the DRAM 6 consumed for managing the pointers can be reduced by managing the same number of pointers as the number of second NSAUs for each namespace.

Meanwhile, for the first NSAU, any buffer space not assigned to the second NSAU of any namespace is assigned to the first NSAU of each namespace. Further, for the first NSAU, the storage locations on the DRAM 6, in which the plurality of map segments are stored, are individually managed using a plurality of second pointers rather than a single pointer.

Thus, individual map segments can be placed at any storage location in any buffer area. Thus, the same buffer area can be shared by the first NSAU of each of two or more namespaces.

When the size of each namespace is not an integer multiple of the size of NSAU, if a configuration for assigning a dedicated buffer area to each first NSAU is used, a part of the dedicated buffer area is a wasted storage area that is not used to store valid map segments. In the present embodiment, since one buffer area can be shared by the respective first NSAUs of two or more namespaces, a plurality of map segments corresponding to the respective first NSAUs of the plurality of namespaces can be stored in the DRAM 6, without generating a wasted storage area.

Further, only one NSAU per namespace requires managing the plurality of second pointers. Therefore, the capacity of the DRAM 6 consumed for managing the second pointers can be reduced, compared to the case of using a configuration of managing a plurality of second pointers for each of all NSAUs.

The write control unit 433 executes a write process, by processing a write command received from the host 2. The write command received from the host 2 designates, for example, a namespace identifier (NSID), a start logical address, a data size, and a data pointer. The NSID is the identifier of the namespace to which the write data is written. The start logical address is a logical address in the namespace to which the write data is written. The data size is the size of write data. The data pointer is a memory address indicating a storage location in the memory 22 of the host 2 in which the write data is stored. The write process includes, for example, a process of acquiring write data associated with the received write command from the memory 22 of the host 2, a process of writing the write data into the non-volatile memory 5, and a process of updating the map segment corresponding to the range of logical addresses including the start logical address such that physical addresses indicating the storage locations of the non-volatile memory 5 where the write data is written are mapped to the logical addresses in the range.

The read control unit 434 executes a read process by processing a read command received from the host 2. The read command received from the host 2 designates, for example, a namespace identifier (NSID), a start logical address, a data size, and a data pointer. The NSID is the identifier of a namespace in which read target data is stored. The start logical address is a logical address in the namespace corresponding to the read target data. The data size is the size of read target data. The data pointer is a memory address indicating a storage location in the memory 22 of the host 2 to which the read target data is to be transferred. The read process includes, for example, a process of translating a start logical address to a physical address by referring to the map segment corresponding to the range of logical addresses including the start logical address, a process of reading data from a storage location in the non-volatile memory 5 indicated by the translated physical address, and a process of transferring the read data to the memory 22 of the host 2.

Figure 5:
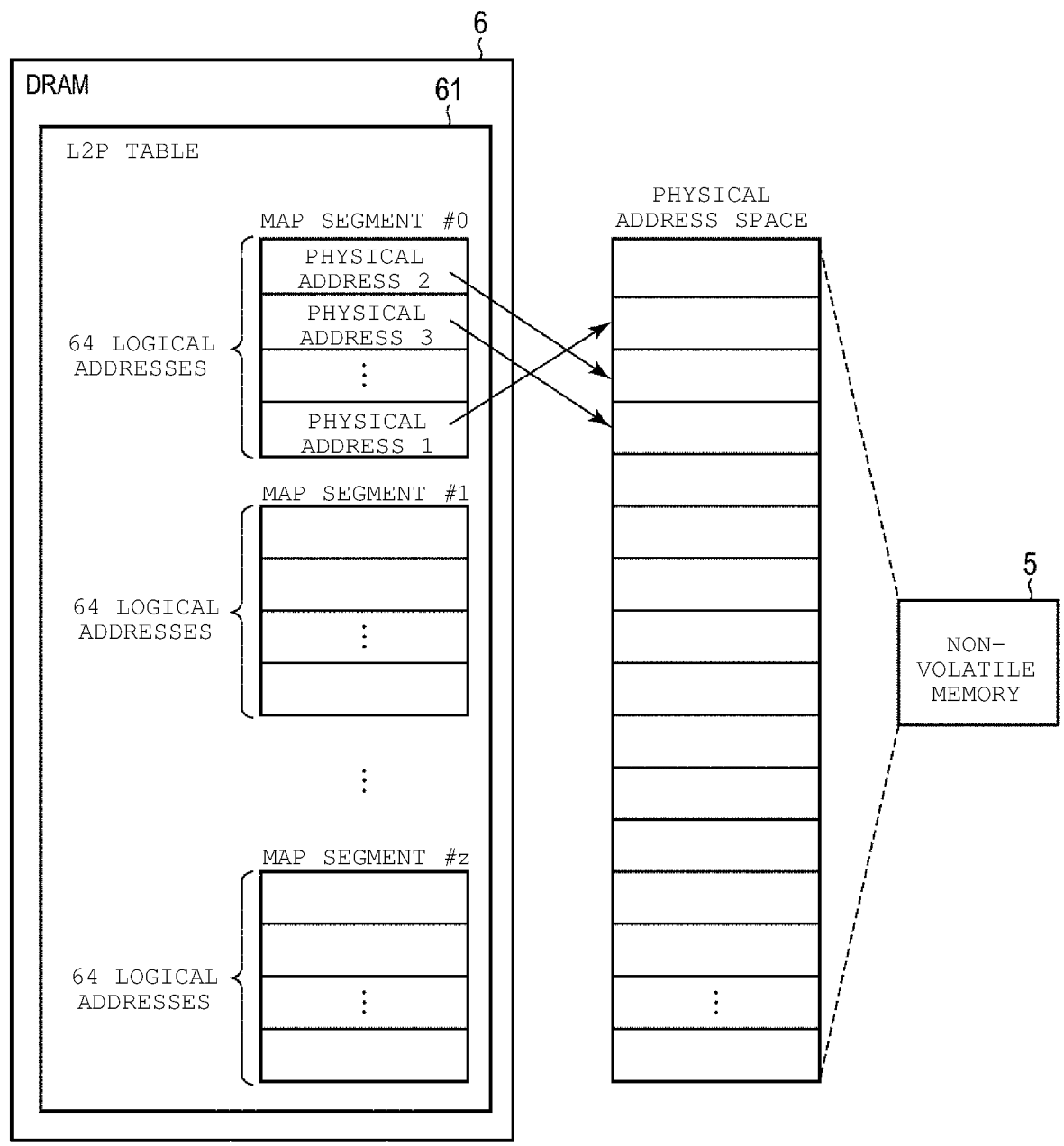
FIG. 5 is a diagram showing an example of a relationship between a logical-to-physical address translation (L2P) table and a physical address space in the memory system according to the embodiment.

Next, the relationship between the L2P table 61 and the physical address space will be described. FIG. 5 is a diagram showing an example of the relationship between the L2P table 61 and the physical address space in the memory system 3 according to the embodiment.

The physical address space is a set of physical addresses. The physical address is an address indicating a storage location of the non-volatile memory 5.

The mapping information of the L2P table 61 stored in the DRAM 6 is a set of plurality of map segments. The mapping information of the L2P table 61 includes, for example, z+1 map segments of map segments #0, #1, ..., and #z. The map segments #0, #1, ..., and #z are each information indicating N physical addresses respectively associated with N consecutive logical addresses in a one-to-one relationship. Here, N is an integer of 2 or more. FIG. 5 shows an example in which each map segment is information indicating 64 physical addresses respectively associated with 64 consecutive logical addresses in a one-to-one relationship.

For example, the first physical address of map segment #0 (here, physical address 2) is the physical address corresponding to the first logical address of the 64 logical addresses corresponding to map segment #0. The second physical address of map segment #0 (here, physical address 3) is the physical address corresponding to the second logical address of the 64 logical addresses corresponding to map segment #0. The last physical address of map segment #0 (here, physical address 1) is the physical address corresponding to the last logical address of the 64 logical addresses corresponding to map segment #0.

Figure 6:
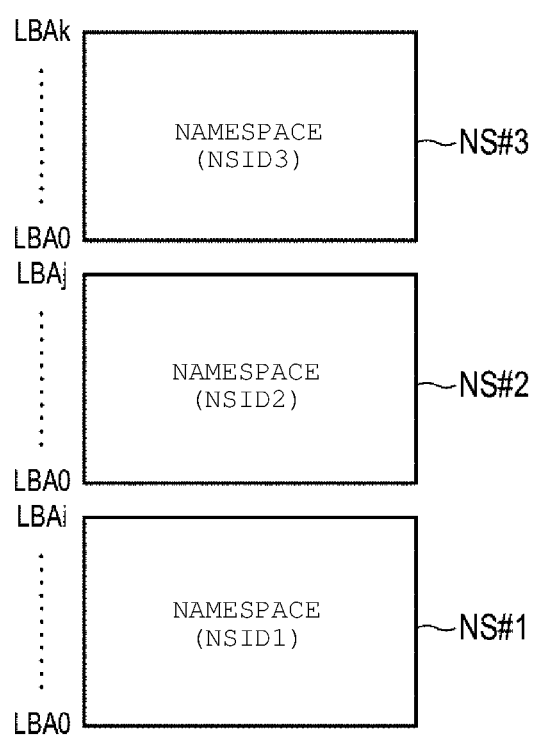
FIG. 6 is a diagram showing an example of namespaces managed in the memory system according to the embodiment.

Next, namespaces will be described. FIG. 6 is a diagram showing an example of namespaces managed in the memory system 3 according to the embodiment. FIG. 6 shows a case where three namespaces (namespace NS #1, namespace NS #2, and namespace NS #3) are managed, in the memory system 3.

Each of the namespace NS #1, the namespace NS #2, and the namespace NS #3 can be set to any size. The size of each of the namespace NS #1, the namespace NS #2, and the namespace NS #3 corresponds to the number of LBAs, for example. Each of the namespace NS #1, the namespace NS #2, and the namespace NS #3 includes consecutive logical addresses starting from LBA0.

The namespace NS #1 is a set of i+1 consecutive logical addresses from LBA0 to LBAi. LBAi is the last logical address of the namespace NS #1. The namespace NS #1 is identified by a namespace identifier (NSID1) indicating 1.

The namespace NS #2 is a set of j+1 consecutive logical addresses from LBA0 to LBAj. LBAj is the last logical address of the namespace NS #2. The namespace NS #2 is identified by a namespace identifier (NSID2) indicating 2.

The namespace NS #3 is a set of k+1 consecutive logical addresses from LBA0 to LBAk. LBAk is the last logical address of the namespace NS #3. The namespace NS #3 is identified by a namespace identifier (NSID3) indicating 3.

Figure 7:
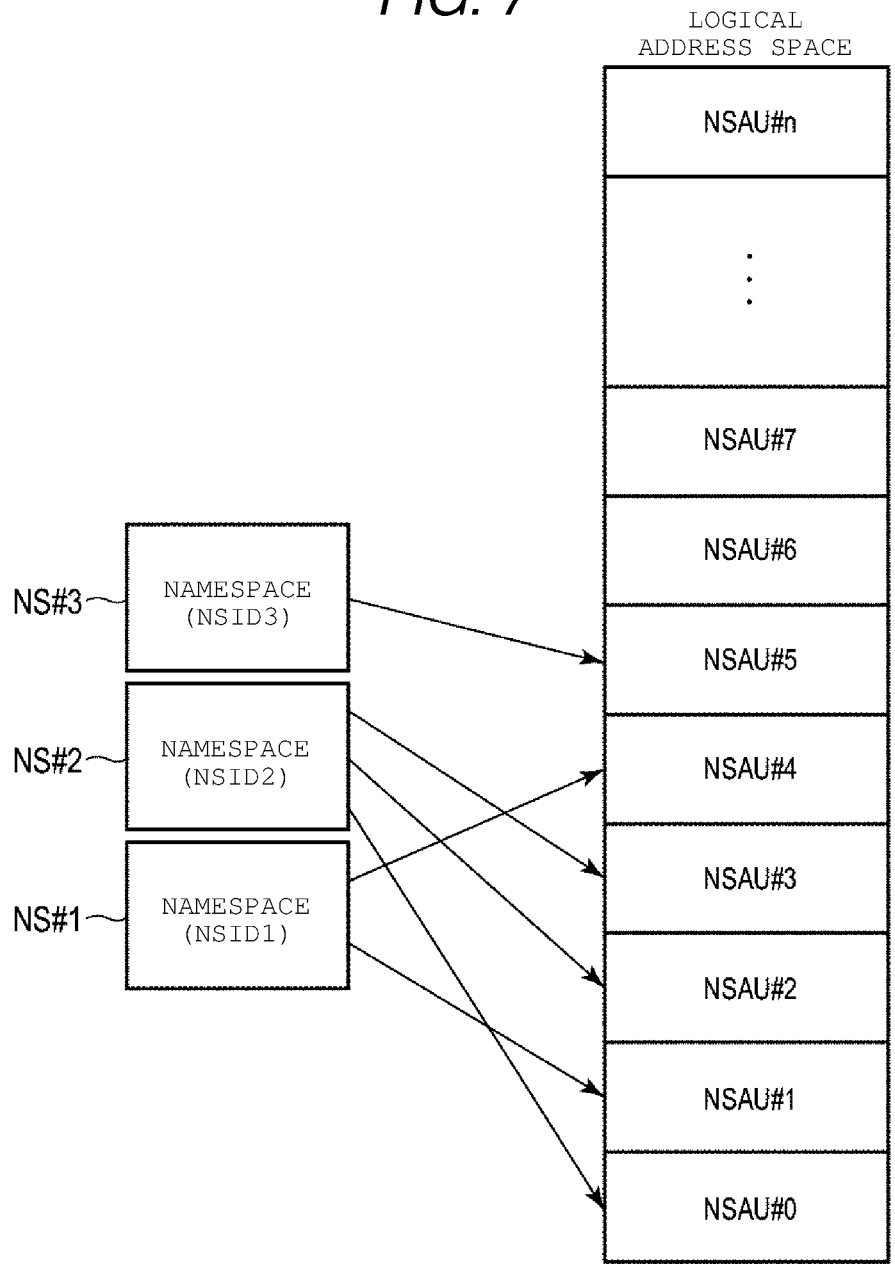
FIG. 7 is a diagram showing an example of a relationship between the namespaces and namespace allocation units in the memory system according to the embodiment.

Next, the relationship between namespaces and NSAUs will be described. FIG. 7 is a diagram showing an example of the relationship between namespaces and NSAUs in the memory system 3 according to the embodiment.

The logical address space of the memory system 3 is divided into a plurality of areas (that is, a plurality of NSAUs). The plurality of NSAUs have the same size. That is, the plurality of NSAUs include the same number of logical addresses. The NSAU is used as a unit to assign a set of logical addresses in the logical address space managed by the memory system 3 to a namespace.

One or more NSAUs are assigned to each namespace, based on the size of the namespace. At this time, the total size of the assigned one or more NSAUs is greater than or equal to the size of the namespace.

In FIG. 7, the logical address space of the memory system 3 is equally divided into n+1 NSAUs. That is, the logical address space of the memory system 3 includes NSAU #0, NSAU #1, . . . , and NSAU #n.

Two NSAUs (NSAU #1 and NSAU #4) are assigned to the namespace NS #1. At this time, the size of the namespace NS #1 is greater than the size of one NSAU and less than or equal to the total size of two NSAUs.

Three NSAUs (NSAU #0, NSAU #2, and NSAU #3) are assigned to the namespace NS #2. At this time, the size of the namespace NS #2 is greater than the total size of two NSAUs and less than or equal to the total size of three NSAUs.

One NSAU (NSAU #5) is assigned to the namespace NS #3. At this time, the size of the namespace NS #3 is less than or equal to the size of one NSAU.

Figure 8:
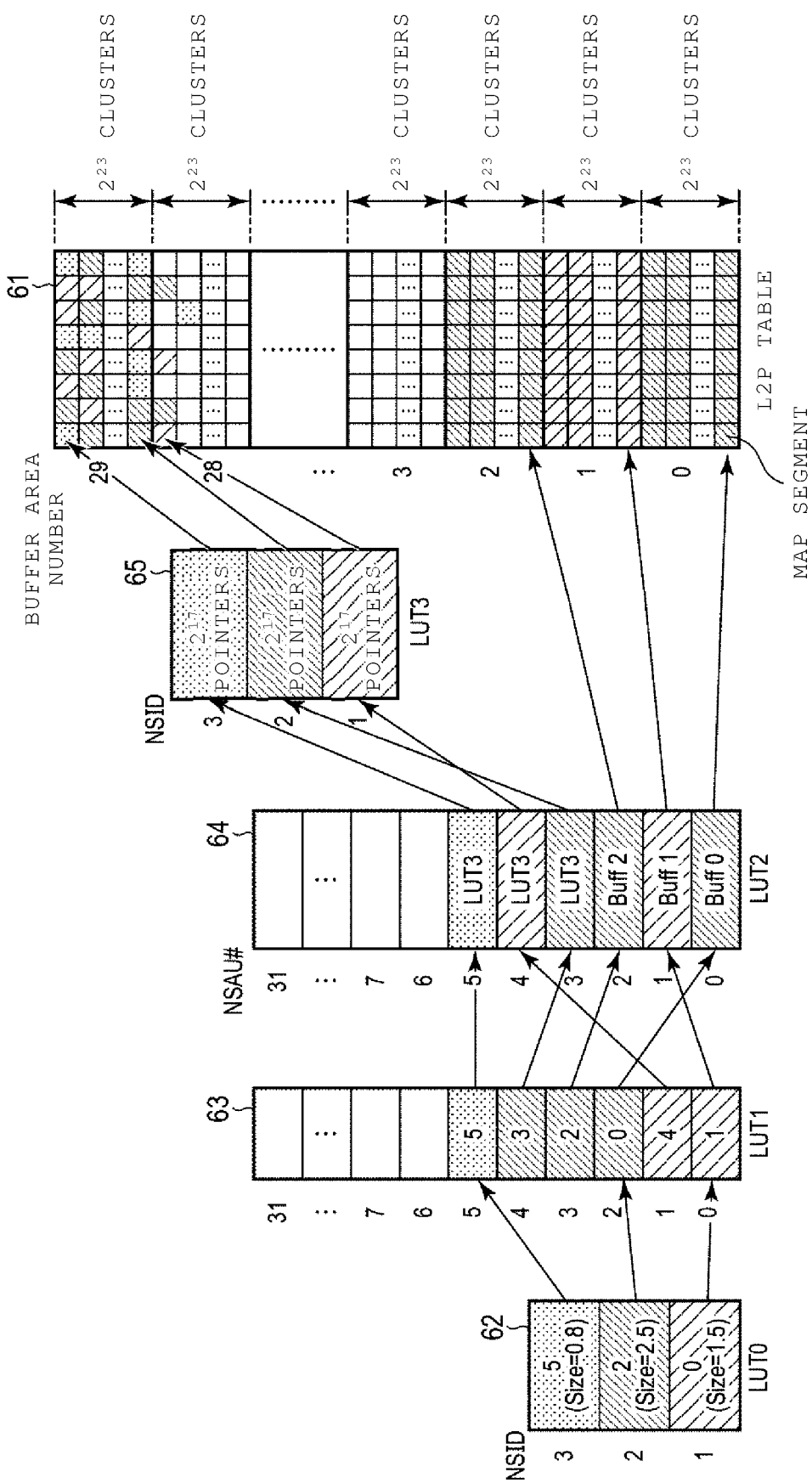
FIG. 8 is a diagram showing an example of a relationship between a plurality of lookup tables (LUTs) and an L2P table in the memory system according to the embodiment.

Next, the correspondence between each namespace and one or more NSAUs assigned to each namespace, and the correspondence between each namespace and storage locations where each of the plurality of map segments corresponding to each NSAU is stored will be described. FIG. 8 is a diagram showing an example of a relationship between the LUT0, LUT1, LUT2, and LUT3, and the L2P table in the memory system according to the embodiment.

Here, it is assumed that the user capacity of the memory system 3 is 1 TB ($=10^{12}$ bytes), 32 NSAUs are created by equally dividing the logical address space of the memory system 3, the size of data per 1 LCA (that is, 1 cluster) is 4 KB ($=2^{12}$ bytes), and the memory system 3 manages three namespaces.

Generally, the user capacity of a storage device is approximately 91% of the size of the logical address space managed by binary numbers. For example, when the user capacity of the memory system 3 is 1 TB ($=10^{12}$ bytes), the size of the logical address space of the memory system 3 is $2^{40}$ bytes. In this case, the number of clusters provided in the user capacity of 1 TB ($=10^{12}$ bytes) is, for example, 244,190,646. The number of clusters is calculated using the following formula defined by The International Disk Drive Equipment and Materials Association (IDEMA). The number of sectors=(user capacity−50)×1,953,504+97,696,368, where one sector is 512 bytes, and the user capacity is expressed in units of GB. Therefore, when the user capacity is 1 TB (=1000 GB), the number of sectors is 1,953,525,168. Converting the number of sectors into the number of clusters, the number of clusters is 244,190,646 (=1,953,525,168/8).

The buffer allocated for the L2P table 61, that is, the storage area of the DRAM 6 in which the L2P table 61 is stored, has 30 buffer areas (buffer areas 0 to 29), for example. The 30 buffer areas are obtained by dividing the storage area of the DRAM 6 in which the L2P table 61 is stored. The 30 buffer areas may have the same size. It should be noted that the end (29th) buffer area does not necessarily need to have the same size as the unit buffer size. That is, the size of the 29th buffer area may be set to a size smaller than the size of the other buffer areas. Each buffer area of the L2P table 61 can be assigned to one NSAU. Further, one or more buffer areas of the L2P table 61 can be commonly assigned to several NSAUs, instead of being assigned to only one NSAU.

One buffer area of the L2P table 61 has a size corresponding to one NSAU. In the example of FIG. 8, since the logical address space ($2^{40}$ bytes) of the memory system 3 is equally divided into 32 NSAUs, the size of one NSAU is $2^{40}$ [bytes]/32=$2^{35}$ [bytes]. Further, since the size of data per cluster is 4 KB ($=2^{12}$ bytes), one NSAU has $2^{23}$ clusters ($=2^{35}$ [bytes]/$2^{12}$ [bytes/cluster]=8,388,608 clusters). One buffer area has a size of, for example, 4 bytes per cluster. Therefore, one buffer area has a size of 32 MB ($=4$ [bytes]× $2^{23}=2^{25}$ [bytes]). That is, the unit buffer size is 32 MB in this example. Further, 244,190,646 (the number of clusters corresponding to the user capacity of 1 TB)/8,388,608 (the number of clusters corresponding to the size of one buffer area)=29.10979342460632<30, so that 244,190,646 clusters corresponding to the user capacity of 1 TB can be managed by 30 buffer areas.

Further, each buffer area of the L2P table 61 includes a plurality of storage locations. One storage location stores one map segment. For example, when one map segment includes information indicating 64 physical addresses respectively corresponding to 64 clusters, and one buffer area of the L2P table 61 has a size corresponding to $2^{23}$ clusters, the number of map segments that can be stored in one buffer area of the L2P table 61 is $2^{17}$ ($=2^{23}/64$).

The LUT0_62 is a table that stores information indicating the size of the namespace and the start entry of the LUT1_63, for each namespace. The LUT0_62 is also referred to as a first table.

The LUT0_62 has entries respectively corresponding to the namespace NS #1, the namespace NS #2, and the namespace NS #3. The entry corresponding to the namespace NS #1 stores information indicating the size of the namespace NS #1 (here, 1.5 times one NSAU) and the start entry (here, 0) of the LUT1_63. The entry corresponding to the namespace NS #2 stores information indicating the size of the namespace NS #2 (here, 2.5 times one NSAU) and the start entry (here, 2) of the LUT1_63. The entry corresponding to the namespace NS #3 stores information indicating the size of the namespace NS #3 (here, 0.8 times one NSAU) and the start entry (here, 5) of the LUT1_63.

The LUT1_63 is a table that stores, for each namespace, in one or a plurality of consecutive entries starting from the start entry stored in the LUT0_62, information indicating one or a plurality of NSAUs assigned to the namespace. The LUT1_63 is also referred to as a second table. The correspondence between each of the plurality of namespaces and one or a plurality of NSAUs assigned thereto is managed by using the LUT0_62 and the LUT1_63.

Each of the two entries (entry 0 and entry 1) of the LUT1_63, which start from the entry 0 as indicated in the LUT0_62, stores information indicating NSAUs assigned to the namespace NS #1. The entry 0 stores information indicating NSAU1, and the entry 1 stores information indicating NSAU4.

Each of the three entries (entry 2, entry 3 and entry 4) of the LUT1_63, which start from the entry 2 as indicated in the LUT0_62, stores information indicating NSAUs assigned to the namespace NS #2. The entry 2 stores information indicating NSAU0. The entry 3 stores information indicating NSAU2. Further, the entry 4 stores information indicating NSAU3.

One entry (entry 5) of the LUT1_63, which starts from the entry 5 as indicated in the LUT0_62, stores information indicating an NSAU assigned to the namespace NS #3. The entry 5 stores information indicating NSAU5.

The LUT2_64 has the same number of entries as NSAUs managed in the memory system 3. The LUT2_64 is a table storing one pointer, for each NSAU. One pointer is a pointer indicating the head storage location of a buffer area or a pointer indicating an entry of the LUT3_65. When the corresponding NSAU is the second NSAU, the pointer is the memory address indicating the head storage location of the corresponding buffer area in the L2P table 61. When the corresponding NSAU is the first NSAU, the pointer indicates one entry in the LUT3_65 corresponding to that namespace. The LUT2_64 is also referred to as a third table.

In the LUT2_64, the entry corresponding to NSAU #0 stores a pointer (Buff 0) indicating the head storage location of the 0th buffer area.

In the LUT2_64, the entry corresponding to NSAU #1 stores a pointer (Buff 1) indicating the head storage location of the first buffer area.

In the LUT2_64, the entry corresponding to NSAU #2 stores a pointer (Buff 2) indicating the head storage location of the second buffer area.

In the LUT2_64, the entry corresponding to NSAU #3 stores a pointer (LUT3) indicating the entry of the LUT3_65 corresponding to the namespace NS #2.

In the LUT2_64, the entry corresponding to NSAU #4 stores a pointer (LUT3) indicating the entry of the LUT3_65 corresponding to the namespace NS #1.

In the LUT2_64, the entry corresponding to NSAU #5 stores a pointer (LUT3) indicating the entry of the LUT3_65 corresponding to the namespace NS #3.

The LUT3_65 has the same number of entries as the number of namespaces managed in the memory system 3. The LUT3_65 is a table that stores a plurality of pointers for each entry. The plurality of pointers stored in each entry respectively point to a plurality of storage locations in a buffer area in which the plurality of map segments corresponding to the first NSAUs are stored. One entry of the LUT3_65 stores one pointer for every 64 clusters (one map segment). That is, one entry of the LUT3_65 stores $2^{17}$ pointers. The LUT3_65 is also referred to as a fourth table.

In the LUT3_65, the entry corresponding to the namespace NS #1 stores $2^{17}$ pointers, each pointing to a storage location in the 28th or 29th buffer area in which a map segment corresponding to NSAU #4 is stored. One pointer indicates the storage location where one of the map segments corresponding to NSAU #4 is stored.

In the LUT3_65, the entry corresponding to the namespace NS #2 stores $2^{17}$ pointers, each pointing to a storage location in the 28th or 29th buffer area in which a map segment corresponding to NSAU #3 is stored. One pointer indicates the storage location where one of the map segments corresponding to NSAU #3 is stored.

In the LUT3_65, the entry corresponding to the namespace NS #3 stores $2^{17}$ pointers, each pointing to a storage location in the 28th or 29th buffer area in which a map segment corresponding to NSAU #5 is stored. One pointer indicates the storage location where one of the map segments corresponding to NSAU #5 is stored.

Here, a procedure for acquiring mapping information corresponding to a logical address (start logical address) designated by an I/O command received from the host 2 will be described.

First, when receiving an I/O command designating at least a namespace identifier and a logical address (start logical address) from the host 2, the controller 4 performs the following process.

The controller 4 uses the designated namespace identifier, the designated logical address, the size of NSAU, the LUT0_62, and the LUT1_63 to select one NSAU from one or more NSAUs which are assigned to the namespace having the designated namespace identifier.

In this case, the controller 4 acquires information indicating the start entry (that is, the start entry number), of the LUT1_63, from the entry of the LUT0_62 corresponding to the designated namespace identifier. For example, when the designated namespace identifier is NSID2, the controller 4 acquires the start entry number (here, 2) stored in the second entry of the LUT0_62. The controller 4 calculates a quotient by dividing the designated logical address by the size of NSAU. The controller 4 then refers to the LUT1_63, by using a value obtained by adding the quotient to the start entry number as an index value. For example, when the size of the namespace NS #2 (corresponding to NSID2) is 250 and the size of NSAU is 100, three NSAUs (here, NSAU #0, NSAU #2, NSAU #3) are assigned to the namespace NS #2. Here, it is assumed that the designated logical address is 150. Since the start entry number is 2 and the quotient obtained by dividing 150 by 100 is 1, the controller 4 refers to the entry of entry number 3 of the LUT1_63, and acquires the value stored in this entry (here, 2). Thus, the controller 4 selects NSAU #2 from the three NSAUs (here, NSAU #0, NSAU #2, and NSAU #3).

The controller 4 translates logical addresses of the designated namespace into internal logical addresses to be accessed belonging to the selected NSAU, by replacing the higher bit portion of the designated logical addresses with a bit string indicating the selected NSAU. When the total number of NSAUs is 32, the top 5 bits of the logical address in the designated namespace are replaced with 5 bits indicating the selected NSAU.

Here, it is assumed that the size of the logical block designated by one logical address (LBA) designated by the I/O command is 4 KB. In this case, one LBA matches one LCA. When the user capacity of the memory system 3 is 1 TB, this LCA is represented by a bit string of 28 bits (i.e., LCA[27:0]). The higher bit portion (LCA[27:23]) of LCA [27:0] is replaced with a bit string (NSAU[4:0]) indicating the selected NSAU. As a result, LCA[27:0] is translated to an internal logical address (NSAU[4:0], LCA[22:0]) to be accessed.

The controller 4 uses the LUT2_64 and the LUT3_65 to specify a memory address indicating a storage location in the DRAM 6 where a map segment corresponding to the internal logical address to be accessed is stored. This memory address is also referred to as a buffer index.

An internal logical address (NSAU[4:0], LCA[22:0]) to be accessed is represented by {NSAU[4:0], LCA[22:6], LCA[5:0]}. The LCA[22:6] is used to specify one map segment among a plurality of map segments corresponding to the selected NSAU. The LCA[5:0] is used to specify one cluster among the 64 clusters included in the specified map segment.

In FIG. 8, two NSAUs, NSAU1 and NSAU4, are assigned to the namespace NS #1 (corresponding to NSID1). Further, three NSAUs, NSAU0, NSAU2, and NSAU3, are assigned to the namespace NS #2 (corresponding to NSID2). Further, only NSAU5 is assigned to the namespace NS #3 (corresponding to NSID3). Thus, NSAU #3, NSAU #4, and NSAU #5 are first NSAUs, and NSAU #0, NSAU #1, and NSAU #2 are second NSAUs.

When the selected NSAU is NSAU #0, NSAU #1 or NSAU #2, the controller 4 acquires, from the LUT2_64, a pointer indicating the head storage location of a specific buffer area in the DRAM 6 where the L2P table 61 is stored. Then, the controller 4 uses the acquired pointer and the LCA[22:6] among the internal logical addresses {NSAU[4:0], LCA[22:6], LCA[5:0]} to be accessed to calculate the buffer index in which the map segment corresponding to the internal logical address to be accessed is stored. In the buffer area corresponding to NSAU #0, NSAU #1, or NSAU #2, a plurality of map segments ($2^{17}$ map segments) are placed in ascending order of internal logical addresses, for example, in ascending order of the LCA[22:6]. Therefore, the controller 4 calculates the buffer index by adding the value of LCA [22:6] as an offset to the start address indicated by the acquired pointer.

The controller 4 then refers to or updates the map segment stored in the storage location in the DRAM 6 indicated by the buffer index. In this case, the controller 4 executes read access or write access to the DRAM 6 by using the memory address indicated by {buffer index, LCA[5:0]}, and refers to or updates one out of the 64 physical addresses included in the map segment.

Further, when the selected NSAU is NSAU #3, NSAU #4, or NSAU #5, the controller 4 acquires a pointer indicating an entry of the LUT3_65, from the LUT2_64.

The controller 4 refers to the entry of the LUT3_65 indicated by the acquired pointer. Each entry of the LUT3_65 stores $2^{17}$ pointers each indicating the storage locations of the $2^{17}$ map segments corresponding to the NSAU. It should be noted that when the size of a certain namespace is not an integer multiple of the size of NSAU, some pointers among the $2^{17}$ pointers are unused.

The controller 4 selects one of the $2^{17}$ pointers stored in the entry of the LUT3_65, based on the 17-bit LCA[22:6] value. The controller 4 then determines the memory address indicated by the selected pointer as a buffer index, and refers to or updates the map segment stored in the storage location in the DRAM 6 indicated by this buffer index. In this case, the controller 4 executes read access or write access to the DRAM 6 by using the memory address indicated by {buffer index, LCA[5:0]}, and refers to or updates one out of the 64 physical addresses included in the map segment.

Figure 9:
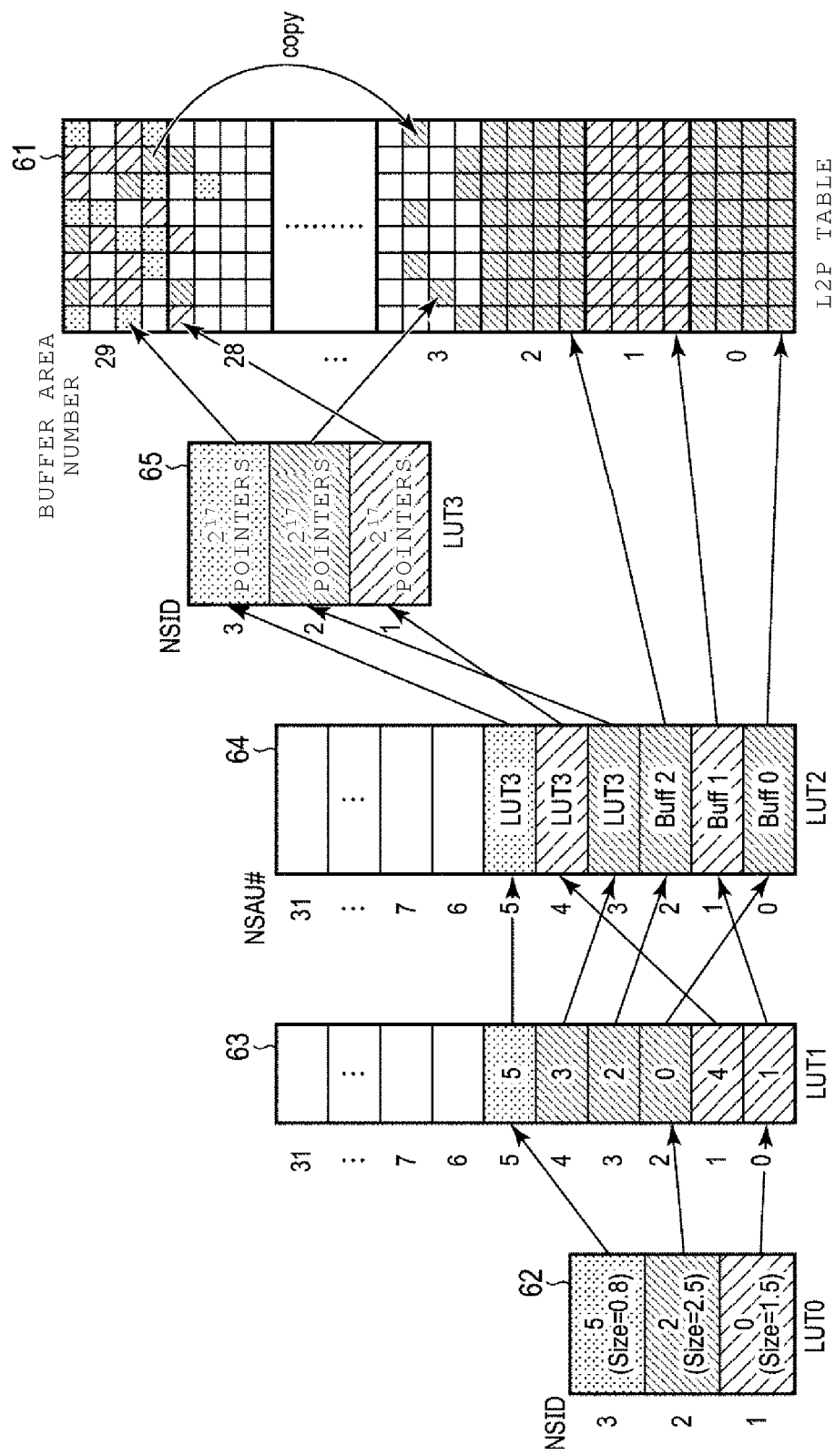
FIG. 9 is a diagram showing a first example of a relationship between the plurality of LUTs and the L2P table in a namespace expansion process executed in the memory system according to the embodiment.
Figure 10:
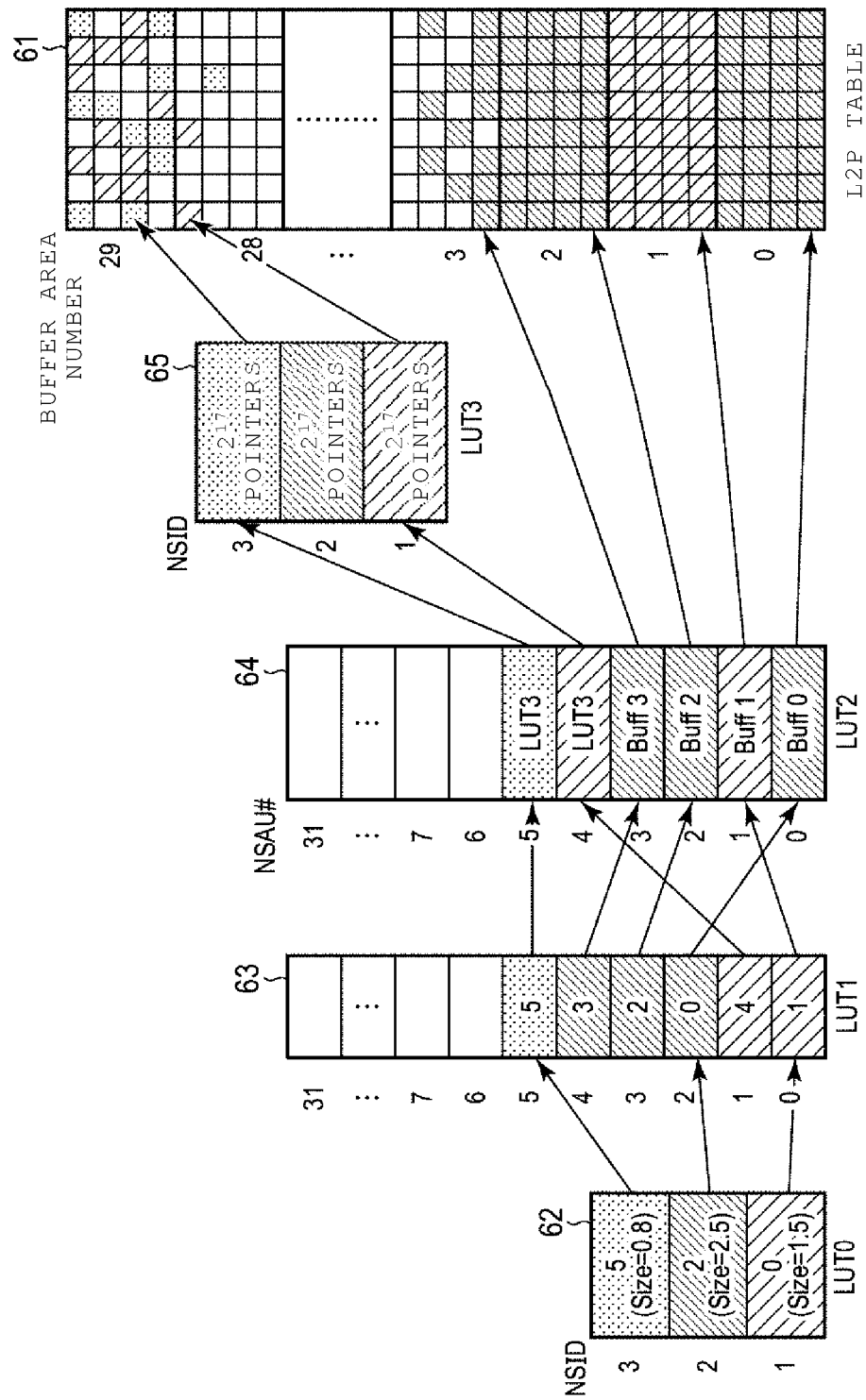
FIG. 10 is a diagram showing a second example of a relationship between the plurality of LUTs and the L2P table in the namespace expansion process executed in the memory system according to the embodiment.
Figure 11:
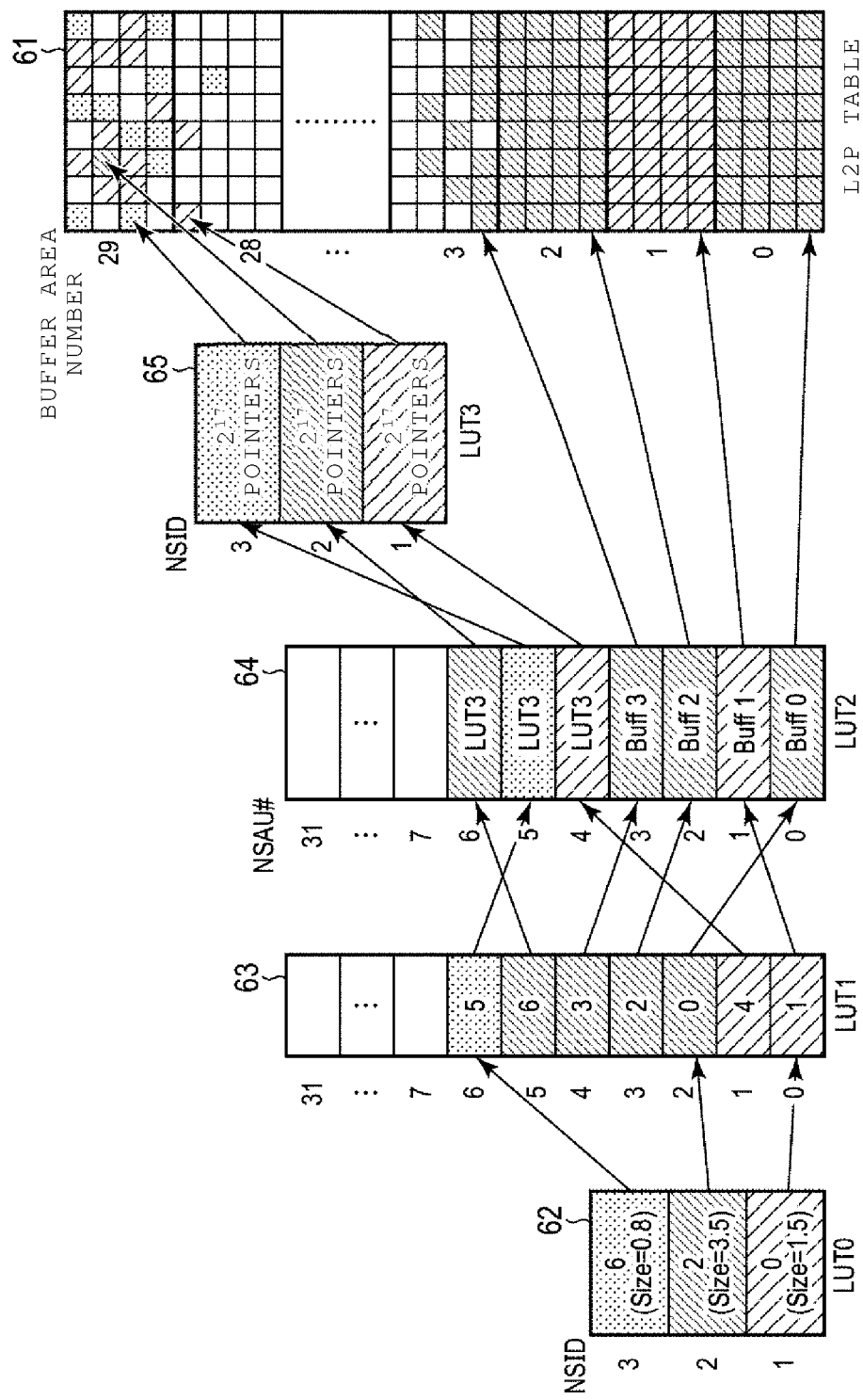
FIG. 11 is a diagram showing a third example of a relationship between the plurality of LUTs and the L2P table in the namespace expansion process executed in the memory system according to the embodiment.

Next, a namespace expansion process will be described. FIG. 9 is a diagram illustrating a first example of the relationship between the LUT0, LUT1, LUT2, LUT3, and the L2P table, in the namespace expansion process executed in the memory system according to the embodiment. In FIGS. 9 to 11, it is assumed that the namespace expansion process is executed in the memory system 3 shown in FIG. 8, to expand the size of the namespace NS #2 from a size corresponding to 2.5 times the size of NSAU to a size corresponding to 3.5 times the size of NSAU.

The controller 4 selects the third buffer area which is a free buffer area that is not assigned to any NSAU.

The controller 4 selects the map segments corresponding to NSAU #3, from among the map segments of the L2P table 61 stored in the 28th and 29th buffer areas. NSAU #3 is an NSAU assigned to the end of the namespace NS #2. Each pointer stored in the entry of the LUT3_65 corresponding to the namespace NS #2 indicates a storage location on the DRAM 6 where one map segment corresponding to NSAU #3 is stored. Thus, the controller 4 can specify the storage location in the DRAM 6 where each of the map segments corresponding to NSAU #3 is stored, by referring to the respective pointers stored in the entry of the LUT3_65 corresponding to the namespace NS #2.

The controller 4 copies the selected map segments to the selected third buffer area. Here, the copy destination storage locations in the third buffer area, to which the selected map segments are copied, are determined by the LCA[22:6] corresponding to the selected map segments.

The controller 4 updates the value of the pointers in the entry of the LUT3_65 corresponding to the copied map segments to a value indicating the copy destination storage locations in the third buffer area.

Thus, among the pointers stored in the entry of the LUT3_65 corresponding to the namespace NS #2, the pointer corresponding to the copied map segment indicates the copy destination storage location in the third buffer area.

Thus, each time one map segment among the plurality of map segments corresponding to NSAU #3 is copied to the third buffer area, the controller 4 updates the pointer corresponding to the copied map segment, among the pointers stored in the entry of the LUT3_65 corresponding to the namespace NS #2. Thus, the process of copying each map segment corresponding to NSAU #3 to the third buffer area can be executed without interrupting the process of an I/O command from the host 2.

FIG. 10 is a diagram illustrating a second example of the relationship between the LUT0, LUT1, LUT2, LUT3, and the L2P table, in the namespace expansion process executed in the memory system according to the embodiment.

When copying of all map segments corresponding to NSAU #3 among the map segments stored in the 28th and 29th buffer areas is completed, the controller 4 updates the pointer stored in the entry of the LUT2_64 corresponding to NSAU #3 from the value indicating the entry of the LUT3_65 corresponding to the namespace NS #2 to the memory address (Buff 3) indicating the head storage location of the third buffer area.

Then, the controller 4 initializes the entry of the LUT3_65 corresponding to the namespace NS #2.

FIG. 11 is a diagram illustrating a third example of the relationship between the LUT0, LUT1, LUT2, LUT3, and the L2P table, in the namespace expansion process executed in the memory system according to the embodiment.

The controller 4 selects NSAU #6, which has not been assigned to any namespace, as an additional NSAU to be assigned to the namespace NS #2.

The controller 4 stores a pointer indicating the entry of the LUT3_65 corresponding to the namespace NS #2, in the entry of the LUT2_64 corresponding to the selected NSAU #6.

The controller 4 then updates the LUT0_62 and the LUT1_63 such that additional areas are additionally assigned to the namespace NS #2.

In this case, the controller 4 first updates the LUT1_63, stores information indicating NSAU #6 in the entry 5 of the LUT1_63, and stores information indicating NSAU #5 in the entry 6 of the LUT1_63. Further, the controller 4 updates the LUT0_62 to update the size of the namespace NS #2, which is stored in the entry of the LUT0_62 corresponding to the namespace NS #2, to indicate 3.5 times one NSAU. Then, the controller 4 updates the information indicating the start entry of the LUT1_63, which is stored in the entry of the LUT0_62 corresponding to the namespace NS #3, to indicate the entry 6.

This causes the controller 4 to additionally assign NSAU #6 to the namespace NS #2.

Figure 12:
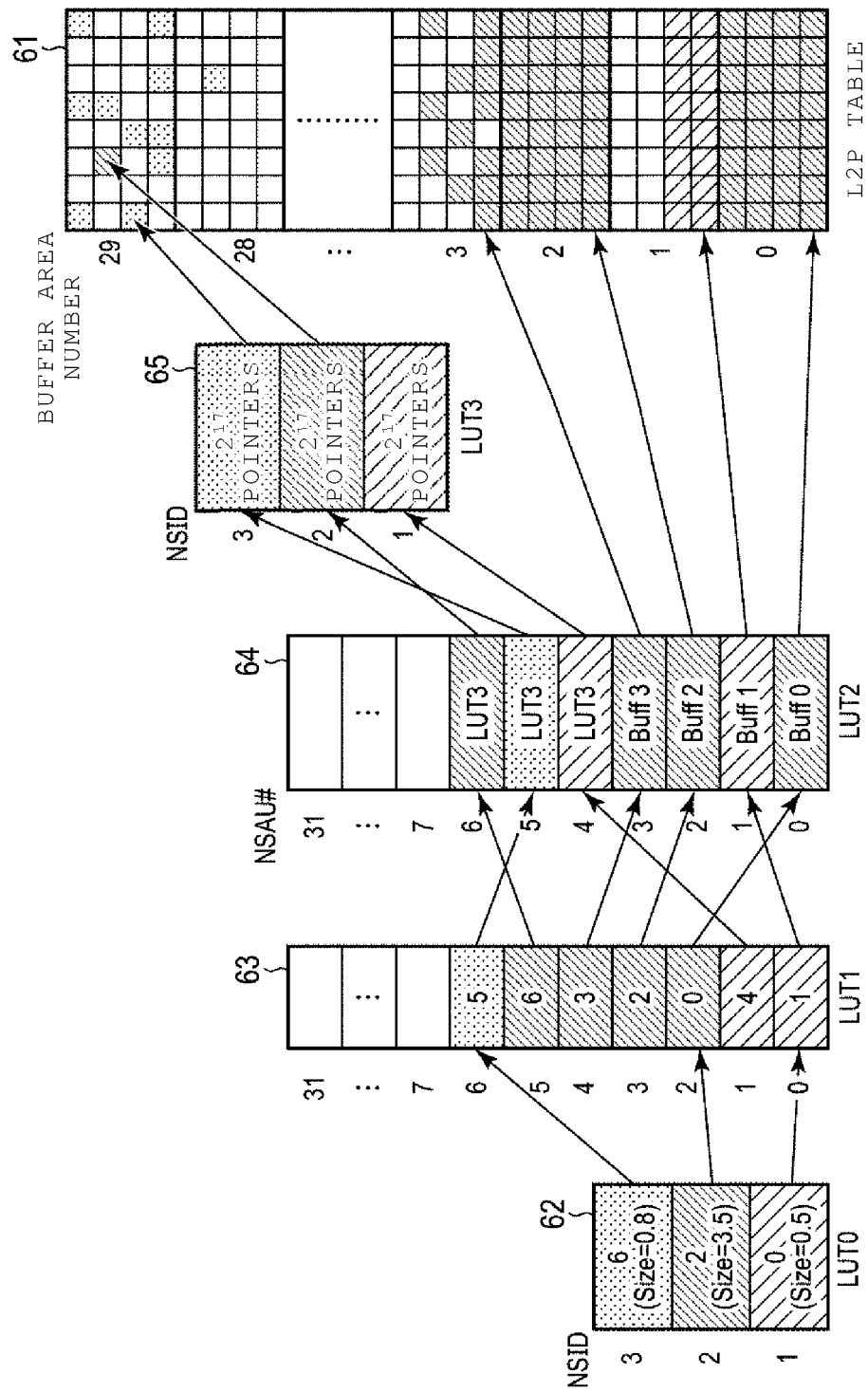
FIG. 12 is a diagram showing a first example of a relationship between the plurality of LUTs and the L2P table in a namespace reduction process executed in the memory system according to the embodiment.
Figure 13:
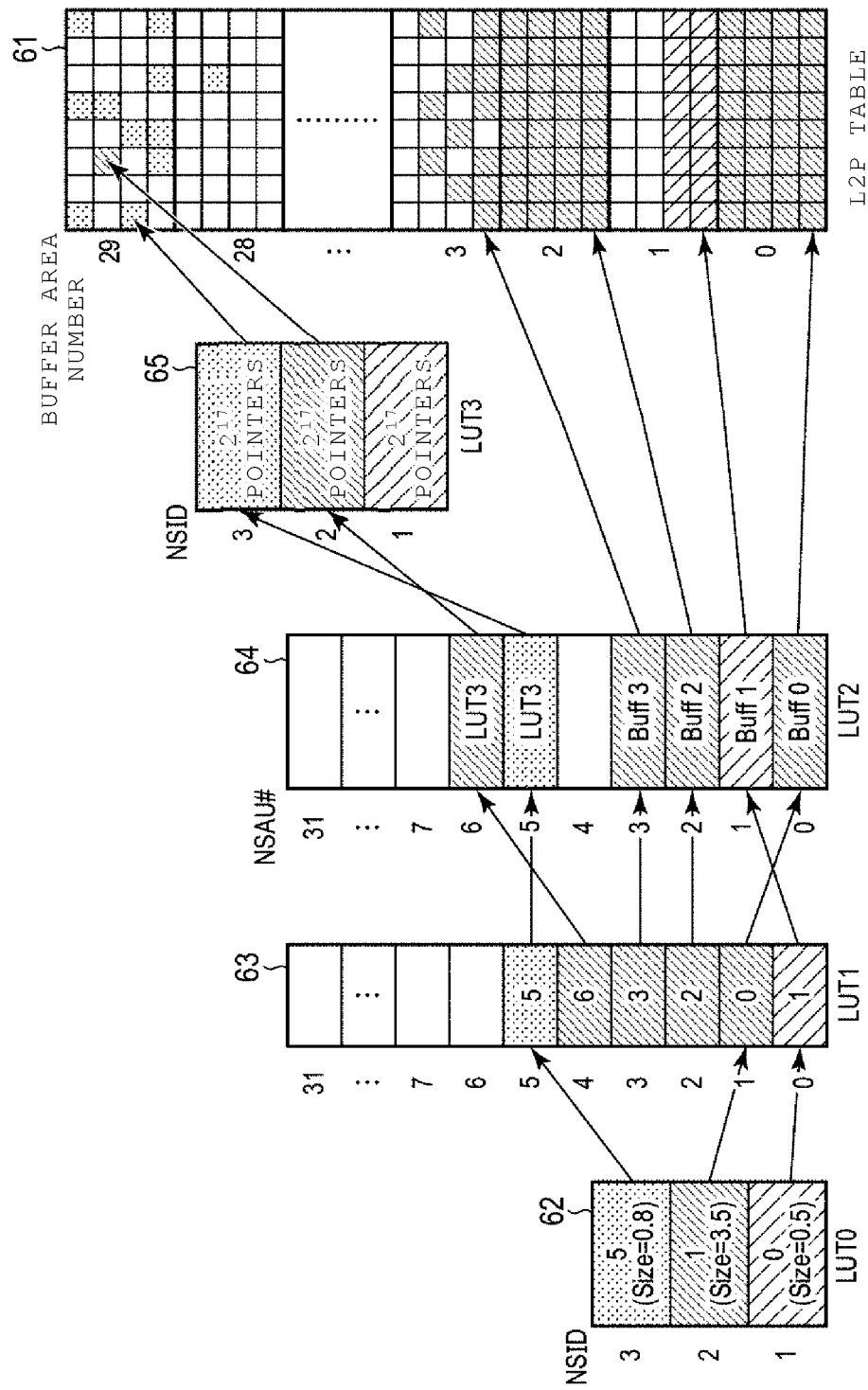
FIG. 13 is a diagram showing a second example of a relationship between the plurality of LUTs and the L2P table in the namespace reduction process executed in the memory system according to the embodiment.
Figure 14:
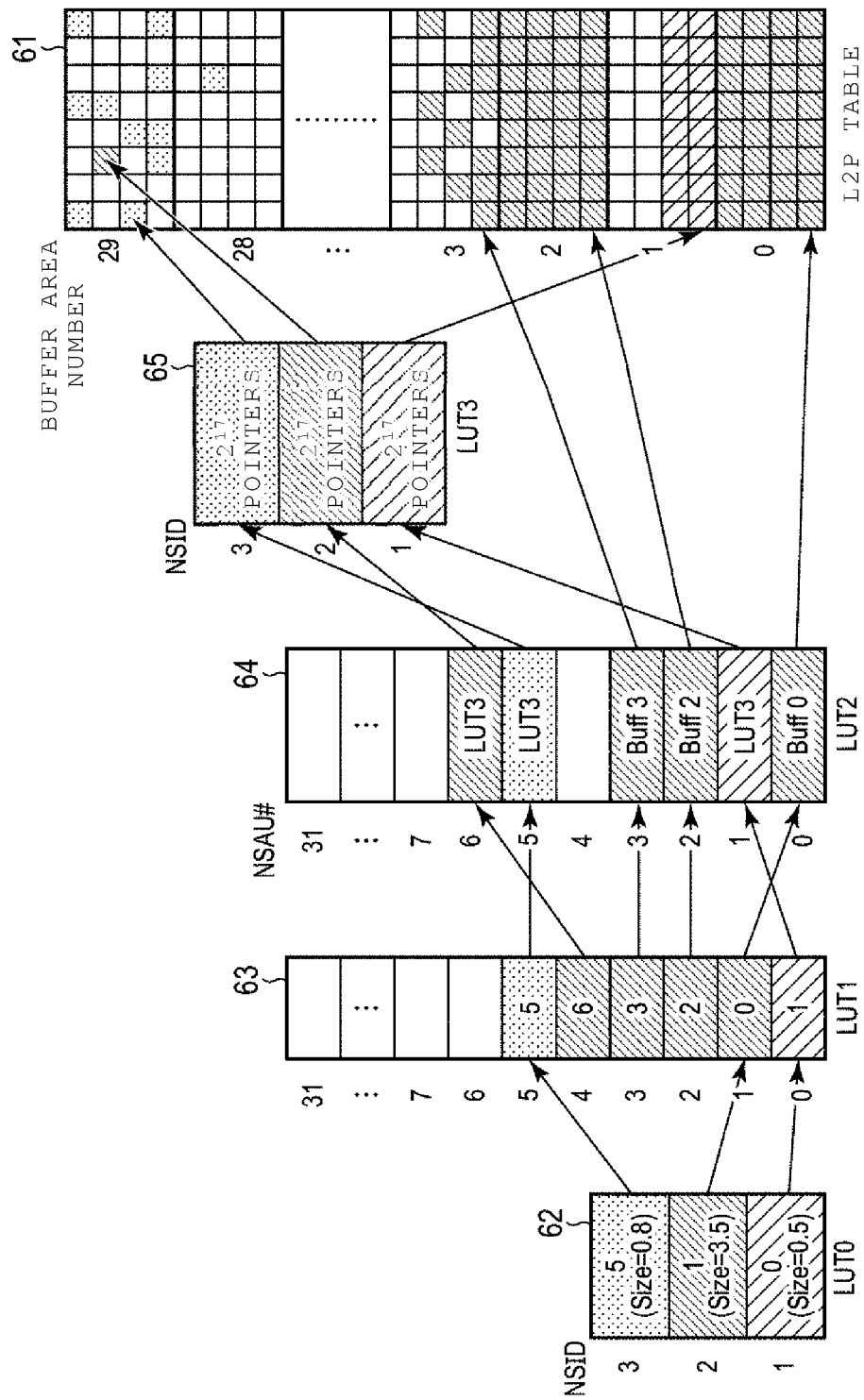
FIG. 14 is a diagram showing a third example of a relationship between the plurality of LUTs and the L2P table in the namespace reduction process executed in the memory system according to the embodiment.

Next, a namespace reduction process will be described. FIG. 12 is a diagram illustrating a first example of the relationship between the LUT0, LUT1, LUT2, LUT3, and the L2P table, in the namespace reduction process executed in the memory system according to the embodiment. In FIGS. 12 to 14, it is assumed that the namespace reduction process is executed in the memory system 3 shown in FIG.

11, to reduce the size of the namespace NS #1 from a size corresponding to 1.5 times the size of NSAU to a size corresponding to 0.5 times the size of NSAU.

The controller 4 updates the information indicating the size, which is stored in the entry of the LUT0_62 corresponding to the namespace NS #1, to indicate 0.5 times one NSAU.

Then, the controller 4 disables all map segments that are no longer needed due to the size reduction of the namespace NS #1. Due to the reduction in the size of the namespace NS #1, the upper logical address group corresponding to $2^{23}$ clusters among the logical addresses provided in the namespace NS #1 becomes unnecessary. Therefore, the map segments corresponding to the higher logical address groups, which are no longer needed, are disabled.

In other words, the controller 4 disables the map segments corresponding to the upper logical address group of the namespace NS #1, which are no longer needed, among the map segments stored in the first, 28th and 29th buffer areas. Thus, since all logical addresses corresponding to NSAU #4 and all map segments corresponding to these logical addresses are no longer used, NSAU #4 becomes unnecessary.

FIG. 13 is a diagram illustrating a second example of the relationship between the LUT0, LUT1, LUT2, LUT3, and the L2P table, in the namespace reduction process executed in the memory system according to the embodiment.

The controller 4 updates the LUT0_62 and the LUT1_63 to de-assign NSAU #4, which is no longer needed due to the size reduction of the namespace NS #1, from the namespace NS #1. In this case, the controller 4 first updates the LUT1_63, stores information indicating NSAU #0 in the entry 1 of the LUT1_63, stores information indicating NSAU #2 in the entry 2 of the LUT1_63, stores information indicating NSAU #3 in the entry 3 of the LUT1_63, stores information indicating NSAU #6 in the entry 4 of the LUT1_63, stores information indicating NSAU #5 in the entry 5 of the LUT1_63, and initializes information stored in the entry 6 of the LUT1_63. Further, the controller 4 updates the LUT0_62 to update the information indicating the start entry of the LUT1_63, which is stored in the entry of the LUT0_62 corresponding to the namespace NS #2, to indicate the entry 1, and update the information indicating the start entry of the LUT1_63, which is stored in the entry of the LUT0_62 corresponding to the namespace NS #3, to indicate the entry 5. Thus, the controller 4 de-assigns NSAU #4, which is no longer needed, from the namespace NS #1.

FIG. 14 is a diagram illustrating a third example of the relationship between the LUT0, LUT1, LUT2, LUT3, and the L2P table, in the namespace reduction process executed in the memory system according to the embodiment.

The controller 4 updates the plurality of pointers stored in the entry of the LUT3_65 corresponding to the namespace NS #1, into values respectively indicating a plurality of storage locations in a buffer area in which the plurality of map segments corresponding to NSAU #1 are stored. NSAU #1 is an NSAU that has been assigned at the end of the namespace NS #1 due to the reduction in size of the namespace NS #1 (i.e., due to de-assignment of NSAU #4). In other words, the plurality of pointers stored in the entry of the LUT3_65 corresponding to the namespace NS #1 are updated to be the memory addresses indicating the storage locations of the first buffer area.

The controller 4 updates the pointer stored in the entry of the LUT2_64 corresponding to NSAU #1, which has been assigned to the end of the namespace NS #1, to a value indicating the entry of the LUT3_65 corresponding to the namespace NS #1.

Figure 15:
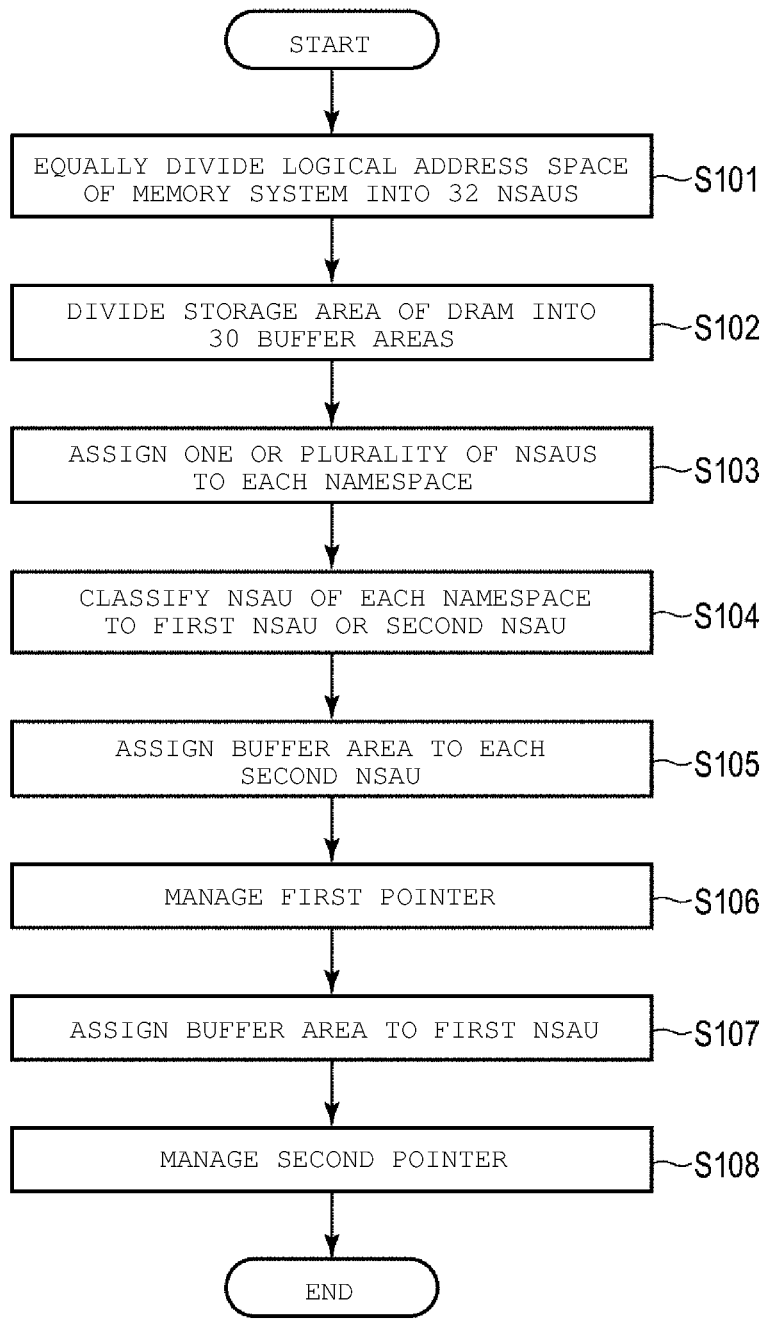
FIG. 15 is a flowchart showing the procedure of a mapping information management process executed in the memory system according to the embodiment.

Next, a procedure of a mapping information management process will be described. FIG. 15 is a flowchart showing the procedure of a mapping information management process executed in the memory system according to the embodiment. Here, as described with reference to FIG. 8, or the like, it is assumed a case where the logical address space of the memory system 3 is equally divided into 32 NSAUs, and the storage area of the DRAM 6, in which the L2P table 61 is stored, is divided into 30 buffer areas.

When the memory system 3 is powered on for the first time, the controller 4 equally divides the logical address space of the memory system 3 into 32 NSAUs (S101).

The controller 4 divides the storage area of the DRAM 6, which is used to store the L2P table 61, into 30 buffer areas (S102).

The controller 4 assigns one or a plurality of NSAUs to each namespace, based on the size of each namespace (S103).

The controller 4 classifies each NSAU assigned to each namespace in step S103 to the first NSAU or the second NSAU (S104).

The controller 4 assigns one buffer area to each second NSAU classified in step S104 (S105).

The controller 4 manages a first pointer indicating the head storage location of the buffer area assigned in step S105, for each second NSAU (S106).

The controller 4 assigns a buffer area among the buffer areas not assigned to any NSAU, to the first NSAU of each namespace such that one buffer area can be shared by the first NSAUs of two or more namespaces (S107).

For each first NSAU, the controller 4 manages a plurality of second pointers respectively indicating a plurality of storage locations in the buffer area, in which a plurality of map segments corresponding to the first NSAU are respectively stored (S108).

Figure 16:
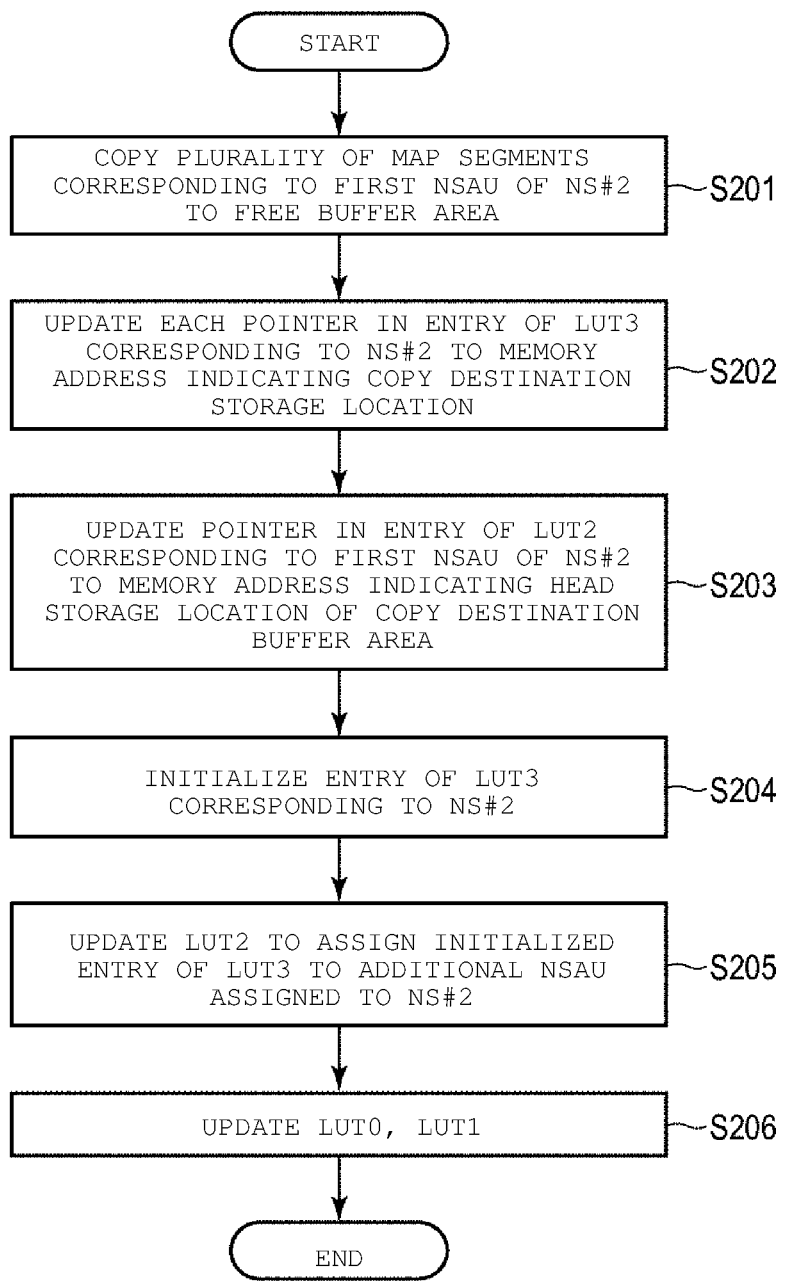
FIG. 16 is a flowchart showing the procedure of the namespace expansion process executed in the memory system according to the embodiment.

Next, a procedure of a namespace expansion process will be described. FIG. 16 is a flowchart showing the procedure of the namespace expansion process executed in the memory system according to the embodiment. Here, it is assumed a case where a request to expand the namespace NS #2 is received from the host 2.

When receiving the request to expand the namespace NS #2 from the host 2, the controller 4 copies the plurality of map segments corresponding to the first NSAU among NSAUs assigned to the namespace NS #2, to a free buffer area of the L2P table 61 (S201).

The controller 4 updates each pointer stored in the entry of the LUT3_65 corresponding to the namespace NS #2 to the memory address indicating the copy destination storage location of the map segment copied in step S201 (S202).

The controller 4 updates the pointer stored in the entry of the LUT2_64 corresponding to the first NSAU of the namespace NS #2, among the entries assigned to the namespace NS #2, to the memory address indicating the head storage location of the copy destination buffer area in which the map segment is copied in step S201 (S203).

The controller 4 initializes the entry of the LUT3_65 corresponding to the namespace NS #2 (S204).

By updating the LUT2_64, the controller 4 assigns the entry of the LUT3_65 initialized in step S204 to the additional NSAU assigned to the namespace NS #2 (S205).

The controller 4 updates the LUT0_62 and the LUT1_63 (S206).

Figure 17:
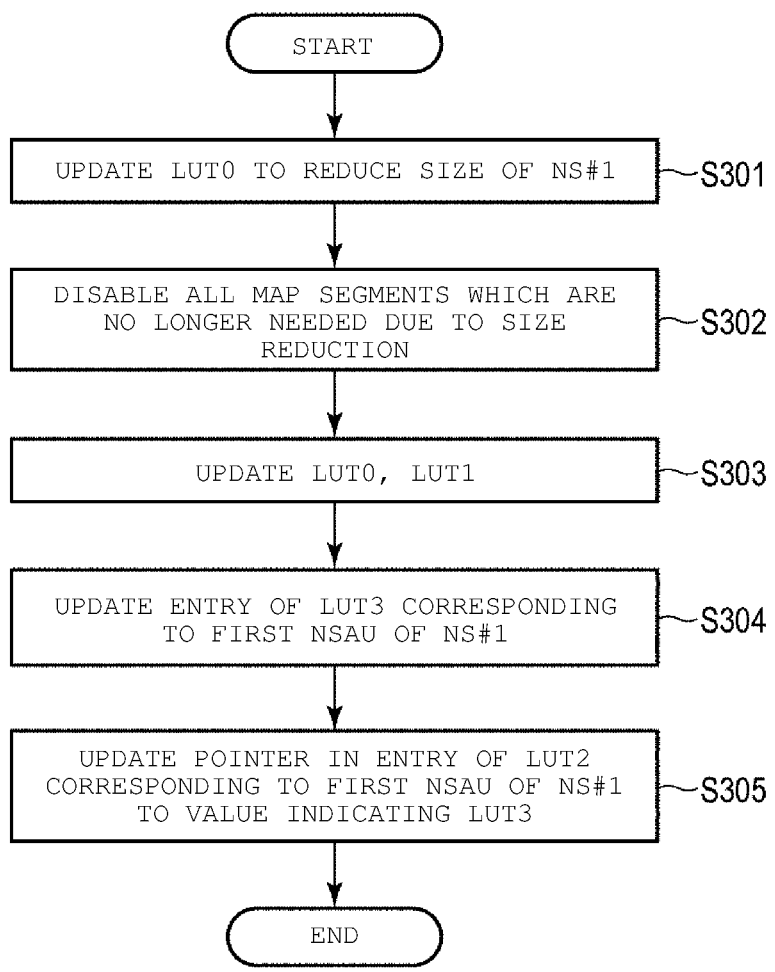
FIG. 17 is a flowchart showing the procedure of the namespace reduction process executed in the memory system according to the embodiment.

Next, a procedure of a namespace reduction process will be described. FIG. 17 is a flowchart showing the procedure of the namespace reduction process executed in the memory system according to the embodiment. Here, it is assumed a case where a request to reduce the namespace NS #1 is received from the host 2.

When receiving the request to reduce the namespace NS #1 from the host 2, the controller 4 reduces the size of the namespace NS #1, by updating the information indicating the size of the namespace NS #1 stored in the entry of the LUT0_62 corresponding to the namespace NS #1 (S301).

The controller 4 disables all map segments in the L2P table 61, which are no longer needed due to the size reduction of the namespace NS #1 executed in step S301 (S302).

The controller 4 updates the LUT0_62 and the LUT1_63 such that unused NSAUs due to the reduction in size of namespace #1 are de-assigned from namespace #1 (S303).

By updating the LUT3_65, the controller 4 updates the pointer stored in the entry corresponding to the namespace NS #1 to the memory address indicating the storage location where the map segment corresponding to the first NSAU of the namespace NS #1 is stored (S304).

By updating the LUT2_64, the controller 4 updates the pointer stored in the entry corresponding to the first NSAU of the namespace NS #1, to the value indicating the entry of the LUT3_65 corresponding to the namespace NS #1 (S305).

As described above, in the memory system 3 according to the embodiment, among the plurality of NSAUs assigned to each namespace, one buffer area is assigned to one second NSAU, which is an NSAU other than the first NSAU and assigned to the end of each namespace. One buffer area can store all map segments corresponding to the size of one NSAU. Then, all logical addresses included in one second NSAU are used by only one namespace, even when the size of the namespace is not an integer multiple of the size of NSAU. Therefore, all storage locations in the buffer area assigned to the second NSAU are utilized without waste.

Further, a buffer area, which is not assigned to any second NSAU, is assigned to the first NSAU of each of the plurality of namespaces such that one buffer area can be shared by the first NSAU of each of the plurality of namespaces. Further, for the first NSAU, a plurality of storage locations on the DRAM 6 where a plurality of map segments are stored are individually managed using a plurality of second pointers rather than a single pointer. Therefore, even when all of the logical addresses provided in each of the plurality of first NSAUs are not used, a dedicated buffer area is not assigned to each first NSAU, so that it is possible to prevent wasted storage locations from being generated in the buffer area.

Thereby, the mapping information in the memory system 3 can be efficiently managed.

Figure 18:
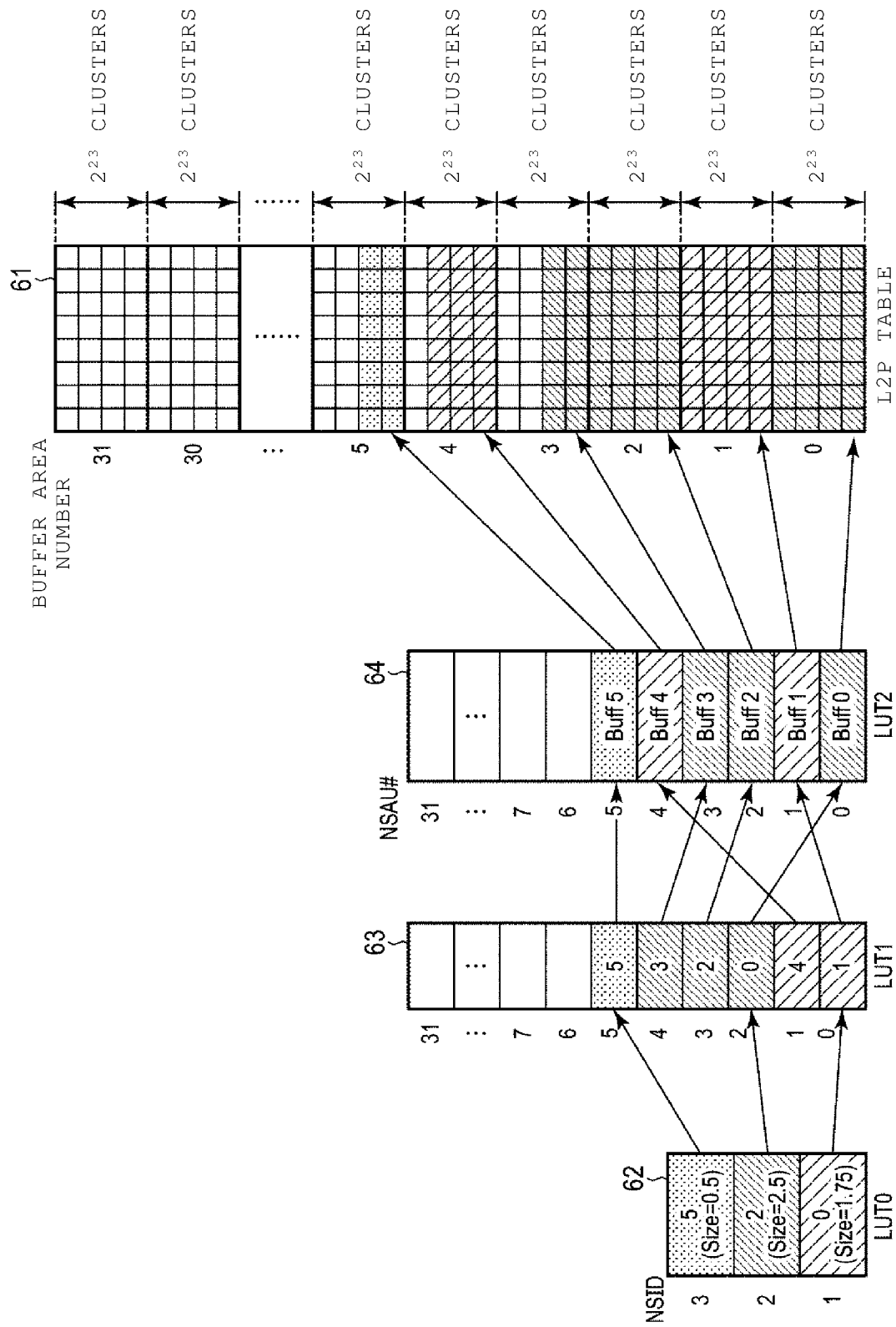
FIG. 18 is a diagram showing an example of a relationship between a plurality of LUTs and an L2P table in a memory system according to a first comparative example.

Next, a memory system according to a first comparative example will be described. FIG. 18 is a diagram showing an example of a relationship between LUT0, LUT1, LUT2, and LUT3, and an L2P table in the memory system according to the first comparative example.

A memory system X according to the first comparative example will be described, focusing on points different from the memory system 3 according to the embodiment.

The memory system X according to the first comparative example manages mapping information, using a method in which all NSAUs respectively occupy dedicated buffer areas.

The memory system X according to the first comparative example divides the storage area of the DRAM in which the L2P table 61 is stored such that dedicated buffer areas can be respectively assigned to all NSAUs. For example, when the logical address space of the memory system X is equally divided into 32 NSAUs, the memory system X prepares the 0th to 31st buffer areas.

Thus, in the memory system X according to the first comparative example, 32 buffer areas from the 0th to the 31st buffer areas are respectively assigned to 32 NSAUs from NSAU #0 to #31, in a one-to-one relationship. It should be noted that for example, one namespace may use 30 buffer areas (that is, 30 NSAUs), and the remaining two namespaces each may use one buffer area (that is, one NSAU).

In FIG. 18, the 0th buffer area is assigned to NSAU #0. The first buffer area is assigned to NSAU #1. The second buffer area is assigned to NSAU #2. The third buffer area is assigned to NSAU #3. The fourth buffer area is assigned to NSAU #4. The fifth buffer area is assigned to NSAU #5.

However, since the size of the namespace NS #2 is 2.5 times the size of one NSAU, NSAU #3 that is the last NSAU of the namespace NS #2 is only half used. Therefore, half of the storage areas of the third buffer area assigned to NSAU #3 are not used.

Similarly, the buffer areas assigned to NSAUs #4 and #5 that are the last NSAUs of the namespace NS #1 and the namespace NS #3 each has storage areas that are not used.

In other words, these unused storage areas have already been assigned to an NSAU and therefore consumed, and are wasted areas that are not used to store any information. Thus, when the size of the namespace is not an integer multiple of the size of NSAU, the storage areas of the L2P table 61 have wasted areas that are not used.

Furthermore, in the first comparative example, the total size of the storage area of the L2P table 61 corresponds to the total size of the logical address space of the memory system X. Therefore, the occurrence of a wasted area in the storage area of the L2P table 61 causes the user capacity of the memory system X to decrease.

Figure 19:
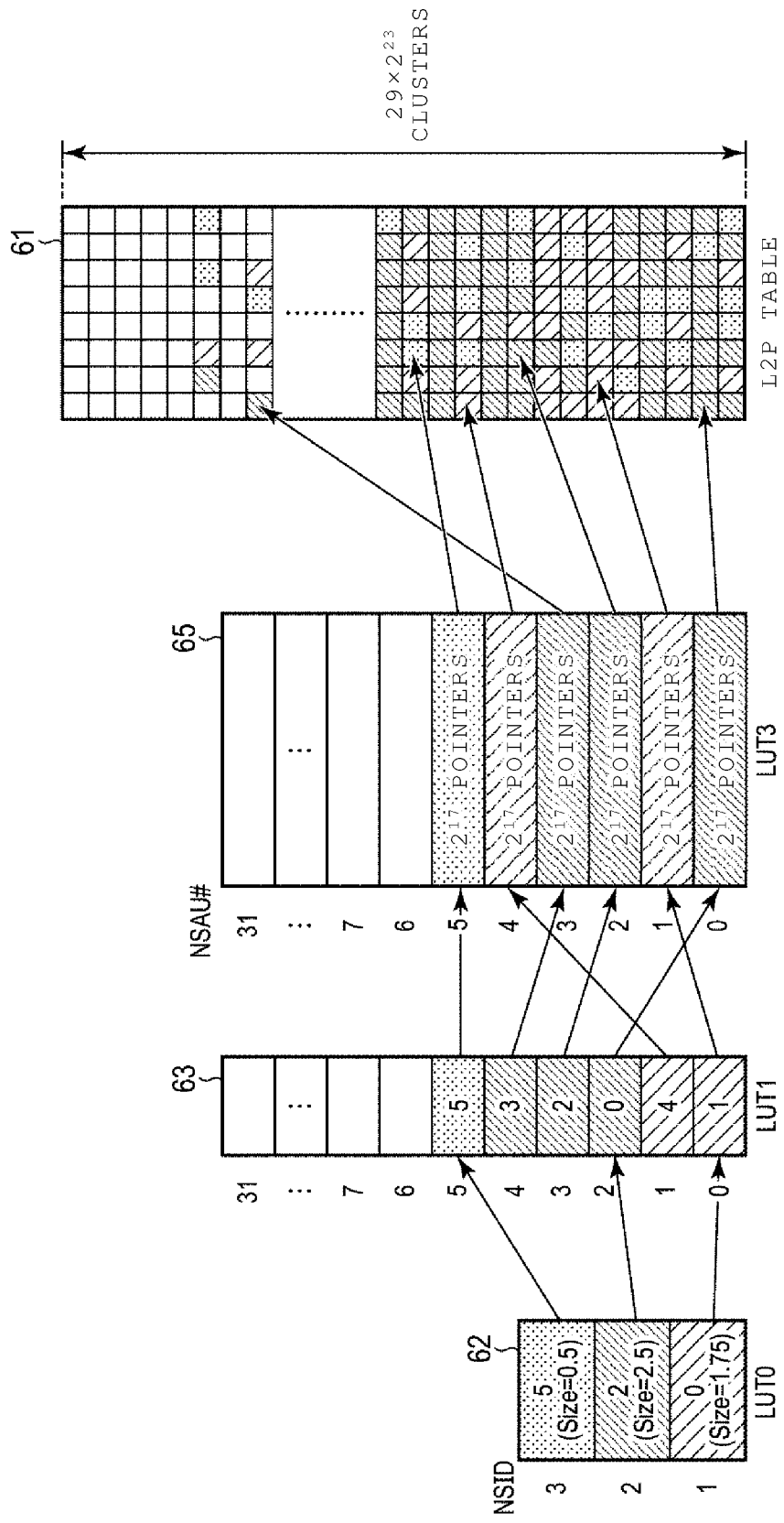
FIG. 19 is a diagram showing an example of a relationship between a plurality of LUTs and an L2P table in a memory system according to a second comparative example.

Next, a second comparative example will be described. FIG. 19 is a diagram showing an example of a relationship between LUT0, LUT1, and LUT3, and an L2P table in a memory system according to the second comparative example.

A memory system Y according to the second comparative example will be described, focusing on points different from the memory system 3 according to the embodiment.

The memory system Y according to the second comparative example manages mapping information using a method in which all NSAUs share a buffer.

The memory system Y according to the second comparative example prepares a large-capacity LUT3_65 having the same number of entries as the number of all NSAUs. Further, all storage areas of the L2P table 61 are shared by all NSAUs.

In the memory system Y according to the second comparative example, the LUT3_65 has entries each storing $2^{17}$ pointers, for each NSAU. Each pointer stored by each entry is a memory address indicating one storage location in the entire L2P table.

Thus, in the memory system Y according to the second comparative example, it is possible to avoid the occurrence of storage locations that are not used in the L2P table 61.

However, in the memory system Y according to the second comparative example, it is necessary to prepare a large LUT3_65 for assigning all NSAUs, in the DRAM 6. Therefore, much of the storage area of the DRAM 6 is consumed for the LUT3_65, and it may be difficult to store the entire L2P table 61 in the DRAM 6.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, comprising:
a non-volatile memory;
a random access memory; and
a controller electrically coupled to the non-volatile memory and the random access memory, wherein the controller is configured to:
store, in the random access memory, a logical-to-physical address translation table including mapping information having a plurality of map segments each indicating N physical addresses of the non-volatile memory respectively associated with consecutive N logical addresses of a logical address space managed by the controller, N being an integer of 2 or more;
manage a plurality of namespaces each including a set of logical addresses,
divide the logical address space into a plurality of logical areas having the same size,
divide a storage region of the random access memory, in which the logical-to-physical address translation table is stored, into a plurality of buffer regions, and
for each namespace, based on a size of the namespace, assign one of the logical areas as a first logical area including at least a last logical address of the namespace, and assign one or more of the logical areas as second logical areas,
for each second logical area, assign one buffer region among the plurality of buffer regions, as a buffer region in which a plurality of map segments corresponding to the second logical area are stored, and manage a first pointer indicating a head storage location of the buffer region assigned to the second logical area, and
assign one buffer region in which a plurality of map segments corresponding to the first logical areas of two or more namespaces are stored, and manage a plurality of second pointers respectively indicating a plurality of storage locations in the one buffer region, in which the plurality of map segments corresponding to the first logical areas of the two or more namespaces are respectively stored.

2. The memory system according to claim 1, wherein
the controller is further configured to manage a correspondence between each of the plurality of namespaces and one or more logical areas of the plurality of logical areas assigned to each of the plurality of namespaces by using a first table and a second table, and
the first table is a table that stores information about each namespace, the information indicating a size of the namespace and a starting location of one or more entries of the second table, and the entries of the second table stores information indicating the one or more logical areas assigned to each namespace.

3. The memory system according to claim 2, wherein
the controller is further configured to store the first pointer for each of the second logical areas of each of the plurality of namespaces in a third table, and
the third table has the same number of entries as the number of the plurality of logical areas.

4. The memory system according to claim 3, wherein
the controller is further configured to manage the plurality of second pointers using a fourth table, and
the fourth table has the same number of entries as the number of the plurality of namespaces, and stores the plurality of second pointers for each of the first logical areas in one of the entries of the fourth table.

5. The memory system according to claim 4, wherein
at least one of the entries of the third table stores a pointer to one of the entries of the fourth table.

6. The memory system according to claim 4, wherein the controller is configured to:
when expanding a size of a first namespace among the plurality of namespaces,
copy the plurality of map segments corresponding to the first logical area of the first namespace to a free buffer region among the plurality of buffer regions,
update a pointer stored in an entry of the third table corresponding to the first logical area of the first namespace to a memory address indicating a head storage location of the free buffer region,
initialize one of the entries of the fourth table corresponding to the first namespace,
store a pointer indicating the initialized entry of the fourth table, in an entry of the third table corresponding to an additional logical area to be assigned to the first namespace, and
update the first table and the second table such that the additional logical area is assigned to the first namespace.

7. The memory system according to claim 6, wherein
each time one map segment among the plurality of map segments corresponding to the first logical area of the first namespace is copied into the free buffer region, the controller updates a pointer corresponding to the map segment copied into the free buffer region, among the plurality of second pointers stored in the entry of the fourth table corresponding to the first namespace, to a value indicating a copy destination storage location in the free buffer region to which the map segment is copied.

8. The memory system according to claim 4, wherein the controller is further configured to:
when reducing a size of a first namespace among the plurality of namespaces,
disable all the map segments that are no longer needed due to reduction in the size of the first namespace,
update the first table and the second table to de-assign from the first namespace, logical areas that are no longer needed due to the reduction in size of the first namespace,
update the plurality of second pointers stored in one of the entries of the fourth table corresponding to the first namespace to values respectively indicating a plurality of storage locations in a buffer region in which a plurality of map segments corresponding to a logical area in which a logical address at an end of the first namespace is included due to reduction in the size of the first namespace, and
update a pointer stored in an entry of the third table corresponding to the logical area in which the logical address at the end of the first namespace is provided, to values indicating the entry of the fourth table corresponding to the first namespace.

9. The memory system according to claim 4, wherein the controller is configured to:
when an input/output command designating a first namespace identifier and a first logical address is received from the host,
select one logical area from the one or more logical areas assigned to a namespace having the namespace identifier, by using the first logical address, a size of one logical area, the first table, and the second table,
translate the first logical address into an internal logical address to be accessed, by replacing higher bits of the first logical address with a bit string indicating the selected logical area,
specify a memory address indicating a storage location in the random access memory where a map segment corresponding to the internal logical address to be accessed is stored, by using the third table and the fourth table, and
refer to or update the map segment corresponding to the internal logical address to be accessed, based on the specified memory address.

10. A control method for controlling a non-volatile memory, comprising:
storing, in a random access memory, a logical-to-physical address translation table including mapping information having a plurality of map segments each indicating N physical addresses of the non-volatile memory respectively associated with consecutive N logical addresses of a logical address space, N being an integer of 2 or more;
managing a plurality of namespaces each including a set of logical addresses;
dividing the logical address space into a plurality of logical areas having the same size;
dividing a storage region of the random access memory, in which the logical-to-physical address translation table is stored, into a plurality of buffer regions;
for each namespace, based on a size of the namespace, assigning one of the logical areas as a first logical area including at least a last logical address of the namespace, and assigning one or more logical areas as second logical areas;
for each second logical area, assigning one buffer region among the plurality of buffer regions, as a buffer region in which a plurality of map segments corresponding to the second logical area are stored;
managing a first pointer indicating a head storage location of the buffer region assigned to the second logical area;
assigning one buffer region in which a plurality of map segments corresponding to the first logical areas of two or more namespaces are stored; and
managing a plurality of second pointers respectively indicating a plurality of storage locations in the one buffer region, in which the plurality of map segments corresponding to the first logical areas of the two or more namespaces are respectively stored.

11. The method according to claim 10, further comprising:
managing a correspondence between each of the plurality of namespaces and one or more logical areas of the plurality of logical areas assigned to each of the plurality of namespaces by using a first table and a second table, wherein
the first table is a table that stores information about each namespace, the information indicating a size of the namespace and a starting location of one or more entries of the second table, and the entries of the second table stores information indicating the one or more logical areas assigned to each namespace.

12. The method according to claim 11, further comprising:
storing the first pointer for each of the second logical areas of each of the plurality of namespaces in a third table, wherein
the third table has the same number of entries as the number of the plurality of logical areas.

13. The method according to claim 12, further comprising:
managing the plurality of second pointers using a fourth table, wherein
the fourth table has the same number of entries as the number of the plurality of namespaces, and stores the plurality of second pointers for each of the first logical areas in one of the entries of the fourth table.

14. The method according to claim 13, wherein
at least one of the entries of the third table stores a pointer to one of the entries of the fourth table.

15. The method according to claim 13, further comprising:
expanding a size of a first namespace among the plurality of namespaces by performing the steps of:
copying the plurality of map segments corresponding to the first logical area of the first namespace to a free buffer region among the plurality of buffer regions,
updating a pointer stored in an entry of the third table corresponding to the first logical area of the first namespace to a memory address indicating a head storage location of the free buffer region,
initializing one of the entries of the fourth table corresponding to the first namespace,
storing a pointer indicating the initialized entry of the fourth table, in an entry of the third table corresponding to an additional logical area to be assigned to the first namespace, and
updating the first table and the second table such that the additional logical area is assigned to the first namespace.

16. The method according to claim 15, wherein
each time one map segment among the plurality of map segments corresponding to the first logical area of the first namespace is copied into the free buffer region, a pointer corresponding to the map segment copied into the free buffer region, among the plurality of second pointers stored in the entry of the fourth table corresponding to the first namespace, is updated to a value indicating a copy destination storage location in the free buffer region to which the map segment is copied.

17. The method according to claim 13, further comprising:
reducing a size of a first namespace among the plurality of namespaces by performing the steps of:
disabling all the map segments that are no longer needed due to reduction in the size of the first namespace,
updating the first table and the second table to de-assign from the first namespace, logical areas that are no longer needed due to the reduction in size of the first namespace,
updating the plurality of second pointers stored in one of the entries of the fourth table corresponding to the first namespace to values respectively indicating a plurality of storage locations in a buffer region in which a plurality of map segments corresponding to a logical area in which a logical address at an end of the first namespace is included due to reduction in the size of the first namespace, and updating a pointer stored in an entry of the third table corresponding to the logical area in which the logical address at the end of the first namespace is provided, to values indicating the entry of the fourth table corresponding to the first namespace.

18. The method according to claim 13, further comprising:

in response an input/output command designating a first namespace identifier and a first logical address received from a host, selecting one logical area from the one or more logical areas assigned to a namespace having the namespace identifier, by using the first logical address, a size of one logical area, the first table, and the second table, translating the first logical address into an internal logical address to be accessed, by replacing higher bits of the first logical address with a bit string indicating the selected logical area, specifying a memory address indicating a storage location in the random access memory where a map segment corresponding to the internal logical address to be accessed is stored, by using the third table and the fourth table, and referring to or updating the map segment corresponding to the internal logical address to be accessed, based on the specified memory address.

19. A controller for a non-volatile memory of a memory system connectable to a host, wherein the controller is configured to:

store, in a random access memory, a logical-to-physical address translation table including mapping information having a plurality of map segments each indicating N physical addresses of the non-volatile memory respectively associated with consecutive N logical addresses of a logical address space managed by the controller, N being an integer of 2 or more;

manage a plurality of namespaces each including a set of logical addresses, divide the logical address space into a plurality of logical areas having the same size, divide a storage region of the random access memory, in which the logical-to-physical address translation table is stored, into a plurality of buffer regions, and for each namespace, based on a size of the namespace, assign one of the logical areas as a first logical area including at least a last logical address of the namespace, and assign one or more logical areas as second logical areas, for each second logical area, assign one buffer region among the plurality of buffer regions, as a buffer region in which a plurality of map segments corresponding to the second logical area are stored, and manage a first pointer indicating a head storage location of the buffer region assigned to the second logical area, and assign one buffer region in which a plurality of map segments corresponding to the first logical areas of two or more namespaces are stored, and manage a plurality of second pointers respectively indicating a plurality of storage locations in the one buffer region, in which the plurality of map segments corresponding to the first logical areas of the two or more namespaces are respectively stored.

20. The controller according to claim 19, further configured to:

manage a correspondence between each of the plurality of namespaces and one or more logical areas of the plurality of logical areas assigned to each of the plurality of namespaces by using a first table and a second table, store the first pointer for each of the second logical areas of each of the plurality of namespaces in a third table, and manage the plurality of second pointers using a fourth table, wherein the first table is a table that stores information about each namespace, the information indicating a size of the namespace and a starting location of one or more entries of the second table, and the entries of the second table stores information indicating the one or more logical areas assigned to each namespace, and the third table has the same number of entries as the number of the plurality of logical areas and at least one of the entries of the third table stores a pointer to an entry of the fourth table, and the fourth table has the same number of entries as the number of the plurality of namespaces and stores the plurality of second pointers for each of the first logical areas in one of the entries of the fourth table.

* * * * *